United States Patent
Solomon et al.

(10) Patent No.: US 12,111,293 B2
(45) Date of Patent: Oct. 8, 2024

(54) SYSTEMS AND METHODS FOR EVALUATING RIGIDITY OF ANGLE BRACKET

(71) Applicants: GM GLOBAL TECHNOLOGY OPERATIONS LLC, Detroit, MI (US); Northwestern University, Evanston, IL (US)

(72) Inventors: Joshua Lee Solomon, Berkley, MI (US); Hui-ping Wang, Troy, MI (US); Bradley J Blaski, Sterling Heights, MI (US); Vivian Vasquez, St. Clair Shores, MI (US); Lu Huang, Troy, MI (US); Dohyun Leem, Troy, MI (US); Jian Cao, Wilmette, IL (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 408 days.

(21) Appl. No.: 17/538,560

(22) Filed: Nov. 30, 2021

(65) Prior Publication Data

US 2023/0168165 A1   Jun. 1, 2023

(51) Int. Cl.
*G01N 3/08* (2006.01)
*G01N 3/06* (2006.01)

(52) U.S. Cl.
CPC ............... *G01N 3/08* (2013.01); *G01N 3/06* (2013.01); *G01N 2203/0017* (2013.01); *G01N 2203/0058* (2013.01); *G01N 2203/04* (2013.01); *G01N 2203/06* (2013.01)

(58) Field of Classification Search
CPC .. G01N 3/08; G01N 3/06; G01N 3/02; G01N 2203/0017; G01N 2203/0058; G01N 2203/04; G01N 2203/06; G01N 2203/0019; G01N 2203/0067
See application file for complete search history.

(56) References Cited

U.S. PATENT DOCUMENTS

| | | | |
|---|---|---|---|
| 4,537,080 A * | 8/1985 | Christiansen | G01N 3/04 73/857 |
| 8,544,340 B1 * | 10/2013 | Ardelean | G01N 3/20 73/849 |
| 2003/0188585 A1 * | 10/2003 | Esser | G01N 3/38 73/826 |
| 2013/0327152 A1 * | 12/2013 | Chen | G01N 3/08 73/818 |
| 2018/0017206 A1 * | 1/2018 | Fauchery | F16B 5/02 |

FOREIGN PATENT DOCUMENTS

JP      2016150381 A  *  8/2016

* cited by examiner

*Primary Examiner* — Jonathan M Dunlap
(74) *Attorney, Agent, or Firm* — Lorenz & Kopf LLP

(57) ABSTRACT

A system for evaluating a rigidity of an angle bracket includes a test system having a first test fixture and a second test fixture. The system includes an angle bracket coupon including a first wall, a second wall coupled to the first wall at a bend to define an angle between the first wall and the second wall, and at least one three dimensional feature defined at the bend that extends between the first wall and the second wall. The angle bracket coupon is to be coupled to at least one of the first test fixture and the second test fixture to evaluate the rigidity of the angle bracket.

9 Claims, 17 Drawing Sheets

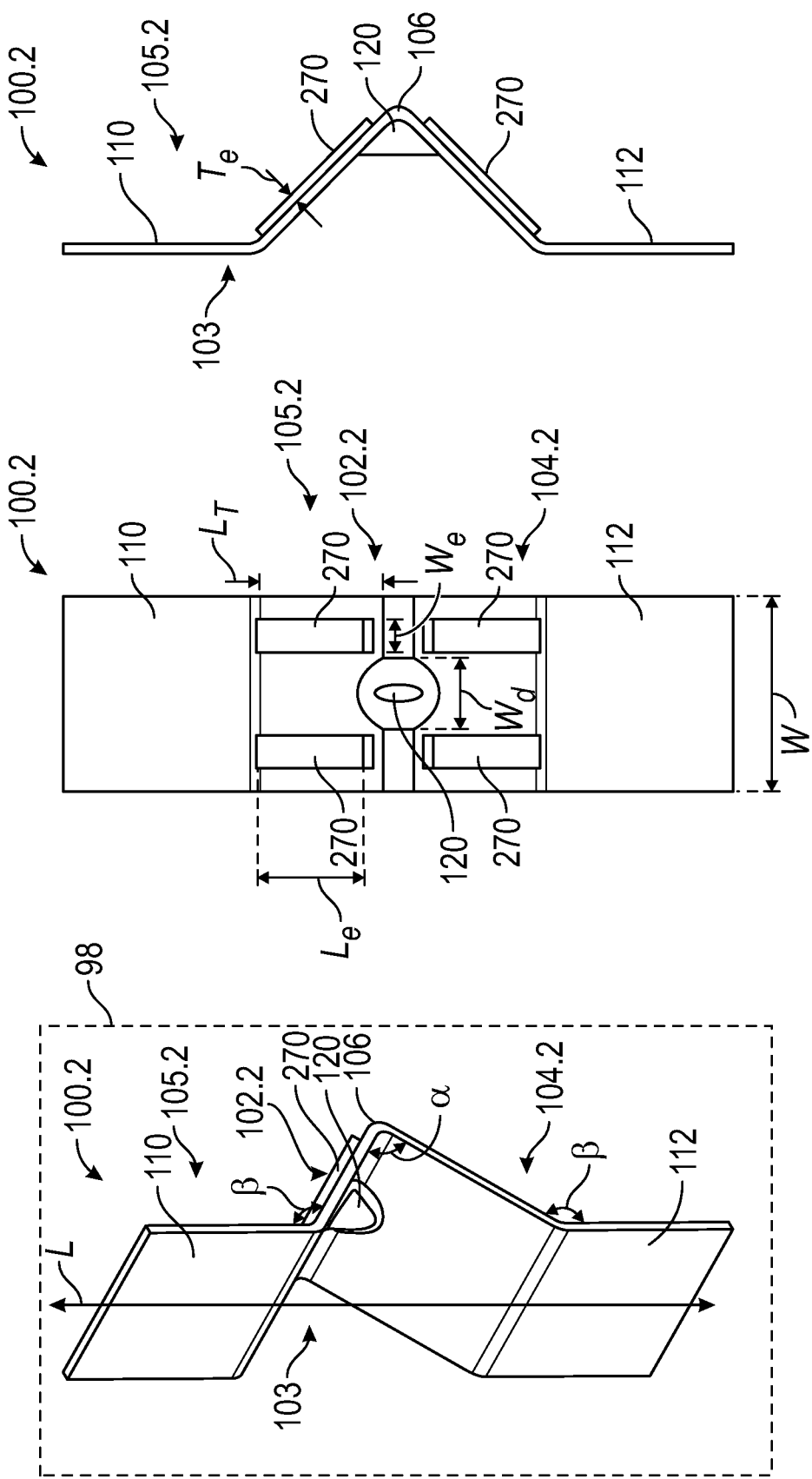

SYSTEMS AND METHODS FOR EVALUATING RIGIDITY OF ANGLE BRACKET

INTRODUCTION

The technical field generally relates to systems and methods for evaluating an angle bracket, and more particularly relates to systems and methods for evaluating rigidity of an angle bracket having at least one three-dimensional feature or dart.

In certain assemblies, one or more angle brackets may be employed to support various components relative to each other. For example, in the instance of a vehicle as an assembly, one or more angle brackets may be employed to interconnect various components to a vehicle structure, such as a frame. In certain instances, due to the shape of the angle bracket, it may be desirable to employ a three-dimensional feature to impart rigidity to the angle bracket. For example, a block or other part may be welded to the angle bracket to increase a rigidity of the angle bracket. The welding of a block or other part to the angle bracket, however, increases manufacturing time, and thus, other techniques are desired to increase a rigidity of an angle bracket.

In one example, a three-dimensional feature, such as a dart, may be formed into the angle bracket. As the three-dimensional feature may have various shapes and sizes, it is desirable for a designer to evaluate the rigidity of the angle bracket with the formed three-dimensional feature or dart to ensure that the angle bracket, with the formed three-dimensional feature, provides sufficient rigidity for the angle bracket. Thus, it is desirable to provide systems and methods for the evaluation of the rigidity of an angle bracket with formed three-dimensional features or darts. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a system for evaluating a rigidity of an angle bracket. The system includes a test system having a first test fixture and a second test fixture. The system includes an angle bracket coupon including a first wall, a second wall coupled to the first wall at a bend to define an angle between the first wall and the second wall, and at least one three dimensional feature defined at the bend that extends between the first wall and the second wall. The angle bracket coupon is to be coupled to at least one of the first test fixture and the second test fixture to evaluate the rigidity of the angle bracket.

The angle bracket coupon includes a first support wing coupled to the first wall and a second support wing coupled to the second wall, and the first support wing is coupled to the first test fixture and the second support wing is coupled to the second test fixture. The first support wing and the second support wing each define a hole, the first test fixture and the second test fixture each define a bore, and a respective mechanical fastener is used to couple the first support wing to the first test fixture and the second support wing to the second test fixture. The first test fixture and the second test fixture include grip clamps. The first test fixture and the second test fixture include compression plates. The first support wing and the second support wing are coupled to the first wall and the second wall to extend outward from the first wall and the second wall, respectively. The first support wing and the second support wing extend outward from the first wall and the second wall, respectively, at an obtuse angle. The at least one three-dimensional feature is a dart, which is defined to extend inward for a predetermined depth, has a predetermined length and a predetermined width. A length of each of the first wall and the second wall is based on the predetermined length of the dart, and a width of each of the first wall and the second wall is based on the predetermined width of the dart. The angle bracket coupon includes at least one bead defined through at least one of the first wall and the second wall. The angle bracket coupon includes at least one bar, which is coupled to at least one of the first wall and the second wall.

Also provided is a method for evaluating a rigidity of an angle bracket. The method includes coupling an angle bracket coupon to at least one of a first test fixture and a second test fixture. The angle bracket coupon is to correspond to the angle bracket and has a three dimensional feature defined at a bend of the angle bracket coupon. The method includes moving, by a test system, the first test fixture relative to the second test fixture, and measuring, by the test system, a force and a displacement associated with the angle bracket coupon. The method includes outputting data of the measuring of the force and the displacement.

The angle bracket coupon has a first wall coupled to a second wall at the bend to define an angle, a first support wing coupled to the first wall and a second support wing coupled to the second wall, and the coupling the angle bracket coupon to the at least one of the first test fixture and the second test fixture includes: coupling the first support wing of the angle bracket coupon to the first test fixture; and coupling the second support wing of the angle bracket coupon to the second test fixture. Each of the first test fixture and the second test fixture is a grip clamp. Each of the first test fixture and the second test fixture is a compression plate. The moving, by the test system, the first test fixture relative to the second test fixture includes: moving, by the test system, the first test fixture in a first direction to apply tension to the angle bracket coupon. The moving, by the test system, the first test fixture relative to the second test fixture includes: moving, by the test system, the first test fixture in a second direction to compress the angle bracket coupon, the second direction opposite the first direction. The moving, by the test system, the first test fixture relative to the second test fixture includes: moving, by the test system, the first test fixture toward the second test fixture to axially compress to the angle bracket coupon to determine an amount of energy absorbed during axial compression. The outputting data of the measuring of the force and the displacement applied includes outputting a graph of the force versus the displacement, and determining the rigidity of the angle bracket based on a slope of the graph. The angle bracket coupon includes one of a bead and a bar coupled to at least one of the first wall and the second wall.

BRIEF DESCRIPTION OF THE DRAWINGS

The exemplary embodiments will hereinafter be described in conjunction with the following drawing figures, wherein like numerals denote like elements, and wherein:

FIG. 15 is a perspective schematic illustration of another exemplary angle bracket coupon having a three-dimensional feature, such as the dart, and at least one bar for evaluating rigidity of the angle bracket for the vehicle in accordance with various embodiments;

FIG. 16 is a back view of the angle bracket coupon of FIG. 15;

FIG. 17 is a side view of the angle bracket coupon of FIG. 15;

DETAILED DESCRIPTION

Figure 4:
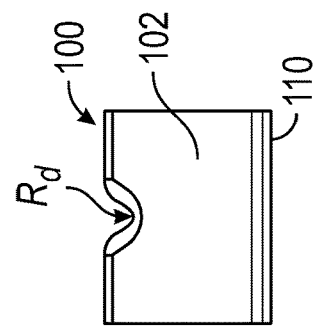
FIG. 4 is a top view of the angle bracket coupon of FIG. 1.

The following detailed description is merely exemplary in nature and is not intended to limit the application and uses. Furthermore, there is no intention to be bound by any expressed or implied theory presented in the preceding introduction, brief summary or the following detailed description. Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the system described herein is merely an exemplary embodiment of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

Figure 1:
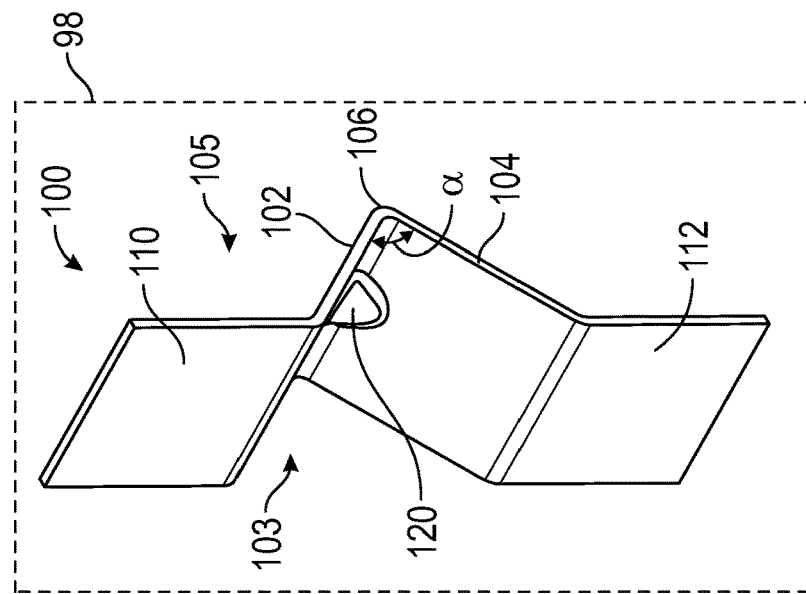
FIG. 1 is a perspective schematic illustration of an exemplary angle bracket coupon having a three-dimensional feature, such as a dart, for evaluating rigidity of an angle bracket including the dart for a vehicle, in accordance with various embodiments.

With reference to FIG. 1, an exemplary angle bracket test coupon or angle bracket coupon 100 is shown. As will be discussed, the angle bracket coupon 100 may be employed with one or more testing methods to evaluate the rigidity of an angle bracket. The angle bracket coupon 100 includes a first wall 102 and a second wall 104, which are interconnected at a bend 106 such that an angle α is defined between the first wall 102 and the second wall 104. The angle α is about 90 degrees, however, the angle α may be from about 10 degrees to about 170 degrees. In this example, the angle bracket coupon 100 includes a first support wing 110 coupled to the first wall 102, and a second support wing 112 coupled to the second wall 104. The first support wing 110 and the second support wing 112 extend outward from the respective one of the first wall 102 and the second wall 104 along an axis that is substantially parallel to a longitudinal axis L of the angle bracket coupon 100. The first wall 102 and the second wall 104 extend along respective axes that are oblique to the longitudinal axis L. In one example, the first support wing 110 and the second support wing 112 extend at an angle β relative to the respective first wall 102 and the second wall 104. In this example, angle β is an obtuse angle, and is about 95 degrees to about 175 degrees. The first support wing 110 and the second support wing 112 may be considered vertical support wings. The first support wing 110 and the second support wing 112 provide stability to the angle bracket coupon 100 during an application of a load during testing, as will be discussed. The first wall 102, the second wall 104 and the angle α defined between the first wall 102 and the second wall 104 are configured to correspond to an exemplary angle bracket, such as an angle bracket for use with a vehicle 98. Generally, the angle bracket coupon 100 simulates the angle bracket for the vehicle 98 such that the performance of the angle bracket coupon 100 during the testing methods discussed herein is a representation of the performance of the angle bracket for the vehicle 98. In this example, the angle bracket coupon 100 is composed of a metal or metal alloy, such as stainless steel, however, the angle bracket coupon 100 may be composed of any suitable material, including, but not limited to polymers, metals, metal alloys, etc. In this example, the first wall 102 and the second wall 104 are illustrated and described herein as comprising smooth, flat or planar walls, however, it should be noted that the first wall 102 and the second wall 104 may include three-dimensional features, such as a slot, curvature, etc. Thus, the first wall 102 and the second wall 104 are merely examples.

In this example, the angle bracket coupon 100 also includes a three-dimensional feature or dart 120 formed between the first wall 102 and the second wall 104 at the bend 106. Generally, the dart 120 is defined as a projection of the angle bracket coupon 100 inward or in a direction toward the first support wing 110 and the second support wing 112 to form a three-dimensional feature and provide a support that extends between the first wall 102 and the second wall 104. Stated another way, the angle bracket coupon 100 has a first coupon side 103 opposite a second coupon side 105. The dart 120 is defined through the second coupon side 105 to extend outwardly from the first coupon side 103. In this example, each of the first coupon side 103 and the second coupon side 105 are substantially smooth. In one example, the dart 120 may be integrally formed with the angle bracket coupon 100, via press brake operations, bend forming, stamping using a uniquely designed die and punch set, additive manufacturing, casting, etc. In other embodiments, the angle bracket coupon 100 may be formed as a coupon having the first wall 102 and the second wall 104 straight (or planar) to each other and without the dart 120 via stamping, casting, machining, etc. and the dart 120 and the bend 106 may be formed through a suitable secondary process, such as stamping. In this example, a single dart 120 is shown, however, the angle bracket coupon 100 may have any number of darts 120.

Figure 3:
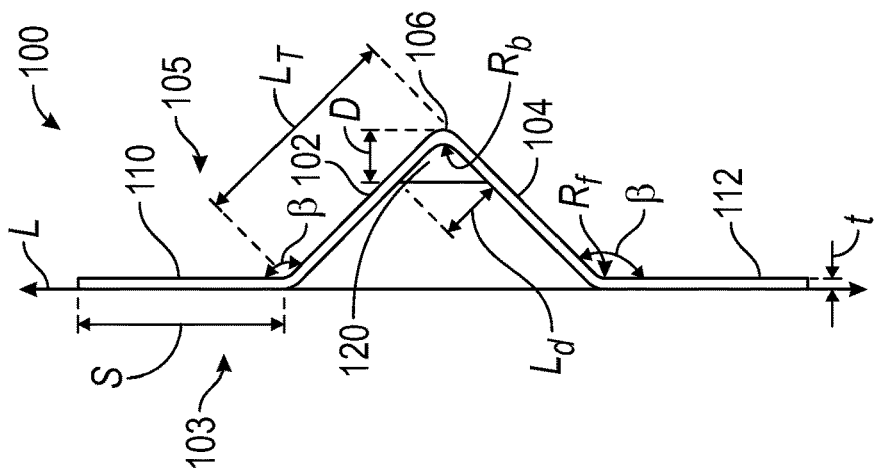
FIG. 3 is a side view of the angle bracket coupon of FIG. 1.
Figure 2:
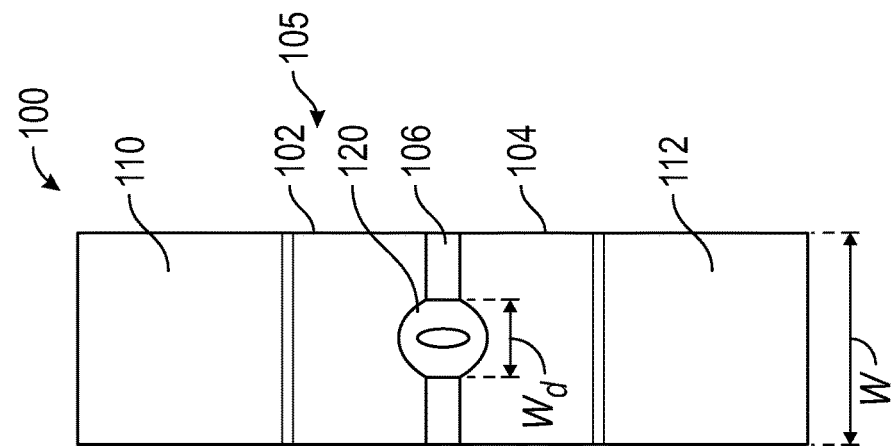
FIG. 2 is a back view of the angle bracket coupon of FIG. 1.

In one example, with reference to FIG. 2, each dart 120 may have a predetermined width $W_d$. The angle bracket coupon 100 has a width W, which is about equal to the width $W_d$ of the dart 120 (as a minimum) to about the width $W_d$ of the dart 120 multiplied by three (as a maximum). In one example, the width $W_d$ of the dart 120 is predetermined to be about 15 millimeters (mm) to about 25 millimeters (mm), and the width W of the angle bracket coupon 100 is about 35 millimeters (mm) to about 45 millimeters (mm). With reference to FIG. 3, the dart 120 also has a predetermined dart length $L_d$, which is about 9.0 millimeters (mm) to about 19 millimeters (mm). The dart length $L_d$ is defined as a distance between an intersection between a first end of the dart 120 and the first wall 102, and an intersection of a second, opposite end of the dart 120 and the second wall 104. For the angle bracket coupon 100 having straight walls, such as the first wall 102 and the second wall 104, each of the first wall 102 and the second wall 104 has a length $L_T$, which is about the dart length $L_d$ (as a minimum) to about the dart length $L_d$ multiplied by six (as a maximum). In one example, the length $L_T$ is about 35 millimeters (mm) to about 45 millimeters (mm). In addition, each of the first support wing 110 and the second support wing 112 of the angle bracket coupon 100 has a support wing length S of about 25 millimeters (mm) to about 50 millimeters (mm). The angle bracket coupon 100 also has a thickness t, which is a thickness of the angle bracket for the vehicle 98 (FIG. 1) and in this example, is about 1.0 millimeters (mm) to about 3.0 millimeters (mm). The bend 106 of the angle bracket coupon 100 also has a predetermined bend radius Rb, which is about 1.0 millimeters (mm) to about 5.0 millimeters (mm). In addition, the angle bracket coupon 100 may also have a first fillet 114 defined between the first wall 102 and the first support wing 110, and a second fillet 116 defined between the second wall 104 and the second support wing 112. The first fillet 114 and the second fillet 116 may each have a radius of fillet $R_f$, which in one example is about 1.0 millimeters (mm) to about 3.0 millimeters (mm). The dart 120 also has a depth D, which in one example is about 2.5 millimeters (mm) to about 5.5 millimeters (mm). With reference to FIG. 4, the dart 120 also has a predetermined dart radius Rd, which is about 1.0 millimeters (mm) to about 5.0 millimeters (mm). It should be noted that the dimensions set forth above and herein are merely an example applicable to angle bracket coupons having the first wall 102 and the second wall 104 straight or planar as shown, and it should be noted that the dart 120 formed in the angle bracket coupon 100 may have any predetermined geometry for evaluation by the testing methods discussed herein.

Figure 5:
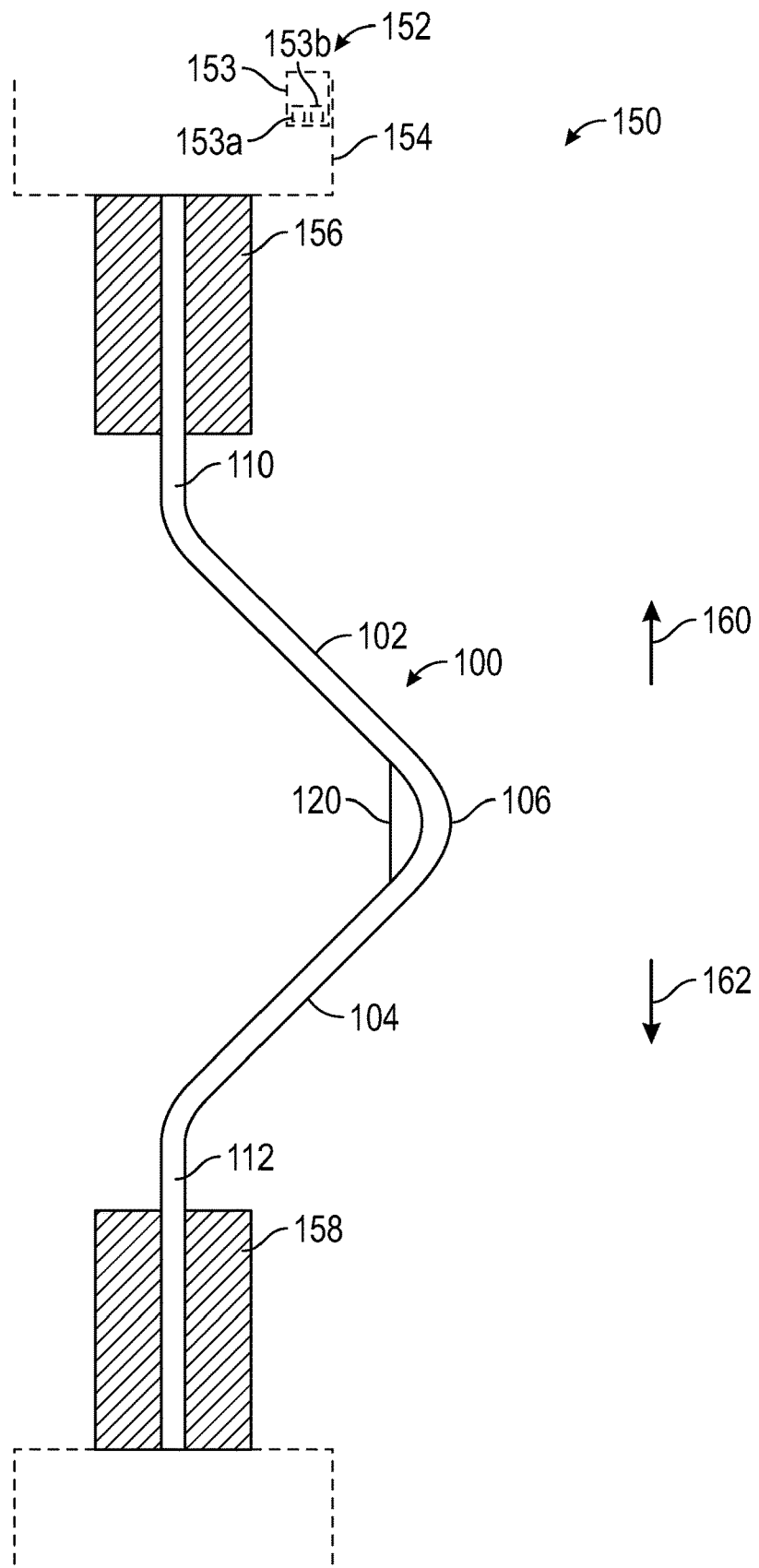
FIG. 5 is a schematic illustration of a system or first test setup for evaluating the rigidity of the angle bracket using the angle bracket coupon of FIG. 1.

In one example, with reference to FIG. 5, the angle bracket coupon 100 is used in a first test setup 150 to determine the rigidity of the angle bracket coupon 100 or ability of the angle bracket coupon 100 having the dart 120 to resist angle change under tension. The first test setup 150 is a first system for evaluating the rigidity of the angle bracket using the angle bracket coupon 100. In one example, the first test setup 150 includes a test system 152, which includes a controller 153, a load cell 154, a first test fixture 156 and a second test fixture 158. The test system 152 comprises, but is not limited to, an MTS® Universal Testing Machine with grip clamps, which is commercially available from MTS Systems Corporation of Eden Prairie, MN, USA. In this example, the first test fixture 156 and the second test fixture 158 each comprise a grip clamp, which is removably coupled to a respective one of the first support wing 110 and the second support wing 112. The second test fixture 158 is fixed relative to the first test fixture 156. The load cell 154 is coupled to the first test fixture 156, and is controllable, via the controller 153 having a processor 153a and a memory 153b, to apply a tensile load to the first test fixture 156 to move the first test fixture 156 relative to the second test fixture 158 while measuring an amount of force applied and the displacement. In one example, the load cell 154 has a load cell capacity of greater than or equal to about 50 kilonewtons (kN) and the first test fixture 156 has a movement speed of about 0.5 millimeters per second (mm/s) for the angle bracket coupon 100 composed of stainless steel. It should be noted that the movement speed is merely exemplary as the movement speed may be increased for crashworthiness validation, for example.

Using the first test setup 150, the first test fixture 156 is moved away from the second test fixture 158 in a first direction 160 and the amount of force applied and the displacement is measured. Based on the movement of the first test fixture 156 in the first direction 160, a graph of force in kilonewtons (kN) (y-axis) versus displacement in millimeters (mm) (x-axis) is generated by the processor 153a of the controller 153 of the test system 152 for the angle bracket coupon 100, which includes a line of the measured performance of the angle bracket coupon 100. As will be discussed with regard to FIGS. 6-8, the data on the graph may be analyzed by the processor 153a of the controller 153 of the test system 152 to determine the rigidity of the angle bracket coupon 100, and/or to evaluate the ability of the angle bracket coupon 100 having the dart 120 to resist angle change under tension, by evaluating the slope of the line. In addition, a turning point of the line on the graph of force versus displacement may provide the maximum load bearing capacity of the angle bracket coupon 100 during flattening. In an instance where it is desired to determine an energy absorption performance of the angle bracket coupon 100, for example, a crashworthiness test, an area under the force versus displacement curve may be calculated to evaluate the energy absorption capability of the angle bracket coupon 100. It should be noted that the use of kilonewtons (kN) for force and millimeters (mm) for displacement throughout this application is merely an example, as any unit for force and displacement (or length) may be used.

Figure 6:
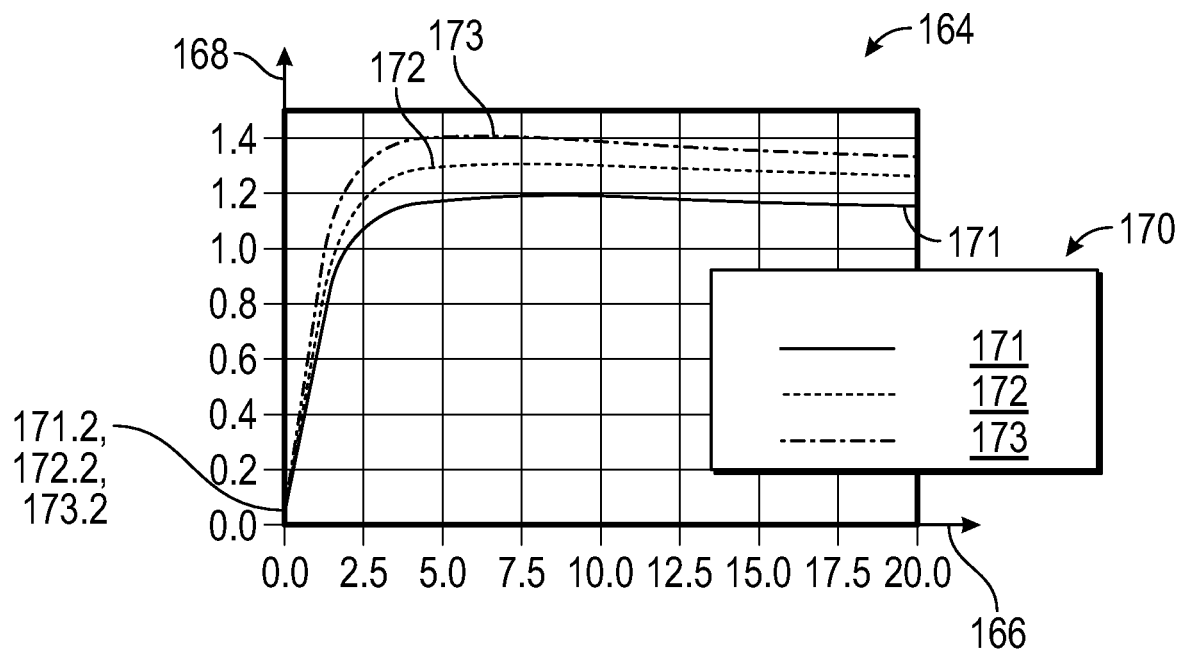
FIG. 6 is a graph of force (y-axis) versus displacement (x-axis) measured by the system of FIG. 5.
Figure 7:
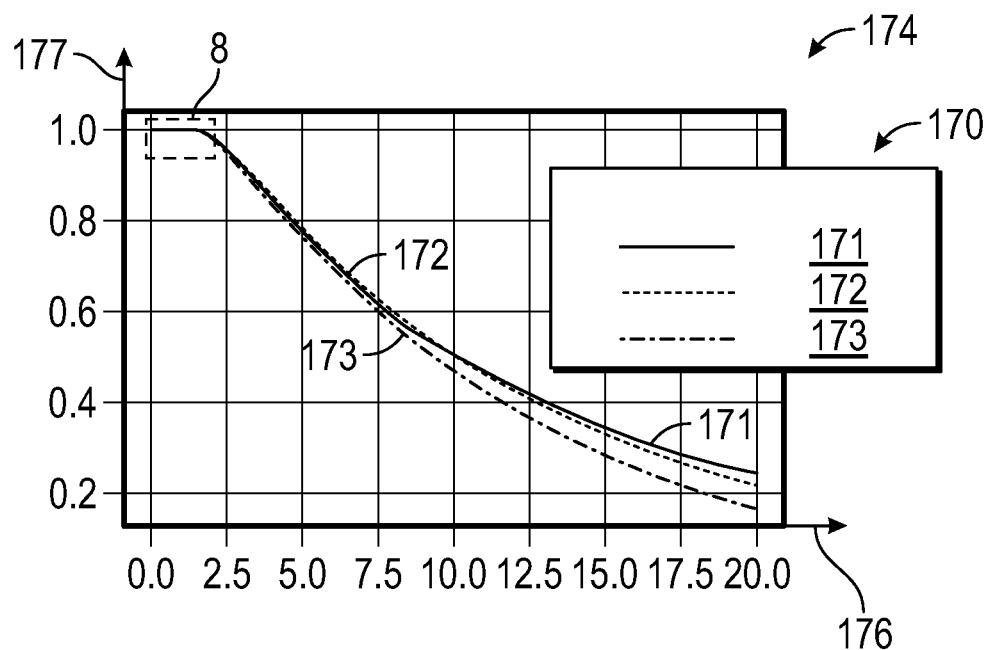
FIG. 7 is a graph of coefficient of determination (y-axis) versus displacement (x-axis) after performing a linear regression on the data of the graph of FIG. 6.
Figure 8:
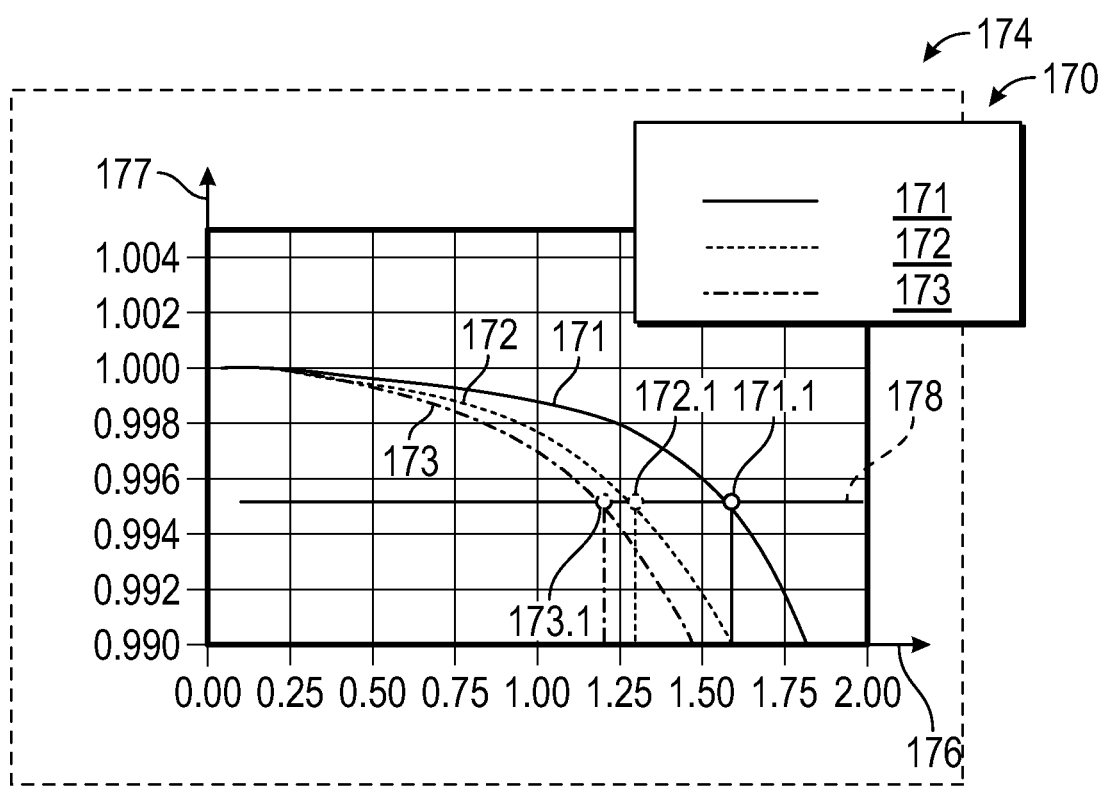
FIG. 8 is a detail view of the graph of FIG. 7 taken at 8 on FIG. 7.

Using the first test setup 150, the first test fixture 156 is moved toward the second test fixture 158 in a second direction 162 and the amount of force applied and the displacement are measured. Based on the movement of the first test fixture 156 in the second direction 162, with reference to FIG. 6, a graph 164 of force in kilonewtons (kN) (y-axis, 168) versus displacement in millimeters (mm) (x-axis, 166) is generated by the controller 153 of the test system 152 for the angle bracket coupon 100 to determine the rigidity of the angle bracket coupon 100 during folding or the ability of the angle bracket coupon 100 having the dart 120 to resist angle change under compression. In the example of FIG. 4, the graph 164 illustrates the force versus displacement observed for the angle bracket coupon 100 having no dart 120 or a baseline angle bracket coupon, labeled line 171 in the legend 170; the angle bracket coupon 100 having the dart 120 with the depth D of 3.0 millimeters (mm), labeled line 172 in the legend 170; and the angle bracket coupon 100 having the dart 120 with the depth D of 5.0 millimeters (mm), labeled line 173 in the legend 170. It should be noted that the graph 164 is merely an example output from the test system 152, as the graph 164 may include a single plot of the force versus displacement for a single angle bracket coupon 100. In order to determine the rigidity of the angle bracket coupon 100, the processor 153a of the controller 153 of the test system 152 performs a linear regression on the observed or measured force versus displacement data (FIG. 6) to result in the graph 174 of FIG. 7. The linear regression is performed based on the observed force versus displacement data (FIG. 6) from an initial force versus displacement measurement value or starting point 171.2. 172.2, 173.2 to an end value. In this example, the end value for the linear regression is the end of the data collection, which in the example of FIG. 6 is at a displacement of 20 millimeters (mm). The graph 174 illustrates $R^2$ (y-axis, 177) versus displacement in millimeters (mm) (x-axis, 176) for each of the lines 171, 172, 173, in which $R^2$ is the coefficient of determination determined from the linear regression. With reference to FIG. 8, a detail view of the graph 175 at 8 on FIG. 7 is shown. In FIG. 8, $R^2$ (y-axis, 177) versus displacement in millimeters (mm) (x-axis, 176) for each of the lines 171, 172, 173 is shown. At the point where the lines 171, 172, 173 meet a predetermined value of $R^2$ labeled as line 178, a displacement end value 171.1, 172.1, 173.1 of the respective lines 171, 172, 173 is an end point for a slope calculation. In this example, the predetermined value of $R^2$ is about 0.995, however, $R^2$ may be about 0.990 to about 1.0.

With reference back to FIG. 6, a slope of each of the lines 171, 172, 173 is calculated by the processor 153a of the controller 153 of the test system 152 from a starting point, 171.2, 172.2, 173.2, respectively, of each line 171, 172, 173, to the displacement end value 171.1, 172.1, 173.1 determined from FIGS. 7 and 8. The slope of each of the lines 171, 172, 173 from the respective starting point, 171.2, 172.2, 173.2 to the respective end point or displacement end value 171.1, 172.1, 173.1 is the rigidity of the respective angle bracket coupon 100, and thus, the angle bracket associated with the vehicle during this folding test. In addition, the apex of the graph of force versus displacement (FIG. 6) provides the maximum load bearing capacity of the angle bracket coupon 100 during folding. In an instance where it is desired to determine an energy absorption performance of the angle bracket coupon 100, for example, a crashworthiness test, an area under the force versus displacement curve may be calculated by the processor 153a of the controller 153 of the test system 152 to evaluate the energy absorption capability of the angle bracket coupon 100.

Figure 9:
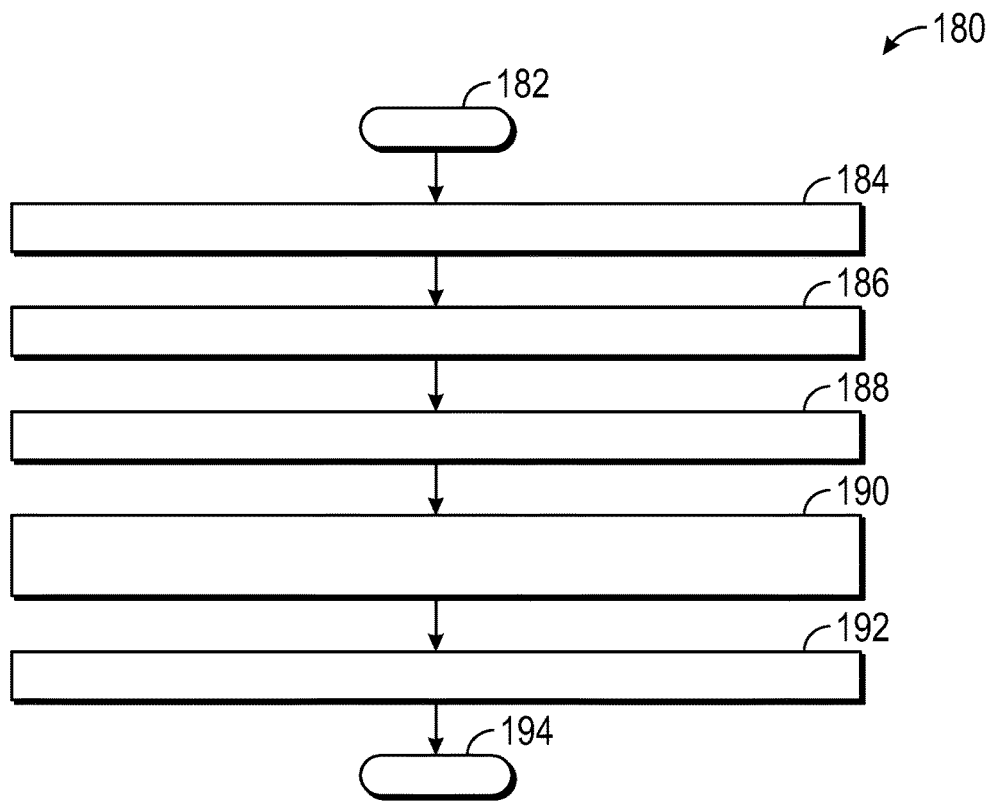
FIG. 9 is a flowchart illustrating a test method that is performed with the first test setup in accordance with various embodiments.

With continuing reference to FIG. 5, and additional reference to FIG. 9, a flowchart illustrates a method of determining the ability of the angle bracket coupon 100 having the dart 120 to resist angle change using the first test setup 150 or a method 180 of evaluating rigidity or resistance of angle change under tension or compression. The method begins at 182. At 184, the method includes coupling the first support wing 110 of the angle bracket coupon 100 to the first test fixture 156. At 186, the method includes coupling the second support wing 112 of the angle bracket coupon 100 to the second test fixture 158. At 188, the method includes moving the first test fixture 156 relative to the second test fixture 158 with the test system 152. The first test fixture 156 is moved in the first direction 160 to determine the rigidity of the angle bracket coupon 100 during flattening or is moved in the second direction 162 to determine the rigidity of the angle bracket coupon 100 during folding. At 190, the method includes measuring, via the load cell 154, the displacement of the angle bracket coupon 100 versus the force applied by the first test fixture 156 during the movement of the first test fixture 156 in the first direction 160 or the second direction 162. At 192, the method includes outputting the measurement data observed by the load cell 154 at 190, for example, outputting the graph of force in kilonewtons (kN) (y-axis) versus displacement in millimeters (mm) (x-axis), for the movement along the first direction 160 or the second direction 162 by the processor 153a of the controller 153 of the test system 152, which includes a line representing the measured performance of the angle bracket coupon 100. The method includes, performing, by the processor 153a of the controller 153 of the test system 152 the linear regression of the data in the graph of force versus displacement. The method includes, determining, by the processor 153a of the controller 153, the displacement end value for the slope calculation, based on a point at which the data from the linear regression is at the predetermined $R^2$ value. The method includes, calculating, by the processor 153a of the controller 153 of the test system 152, the slope of the line on the graph of force versus displacement based on the initial start point of measurement and the end point determined by the linear regression to determine the rigidity of the angle bracket coupon 100. By analyzing the graph of the force versus displacement, the rigidity of the angle bracket coupon 100 having the dart 120, and thus, the angle bracket associated with the vehicle 98 (FIG. 1) is determined. This enables a designer to determine, based on the measurement data for the rigidity or resistance to angle change under tension or compression whether the dart 120 provides acceptable rigidity for the angle bracket of the vehicle 98 (FIG. 1) based on a predetermined threshold for resistance to angle change for the angle bracket associated with the vehicle 98 (FIG. 1). The method ends at 194. It should be understood that the method 180 is repeated to obtain data for the force versus displacement for the movement of the angle bracket coupon 100 in both the first direction 160 and the second direction 162. Further, it should be noted that while the method 180 is described herein as using the test system 152, the method 180 may be performed using mechanical simulation software such as Abaqus FEA commercially available from Dassault Systèmes SE of Vélizy-Villacoublay, France or LS-DYNA commercially available from Ansys of Canonsburg, Pennsylvania, USA to determine the rigidity or resistance of the angle change under tension or compression for the angle bracket coupon 100.

Figure 10:
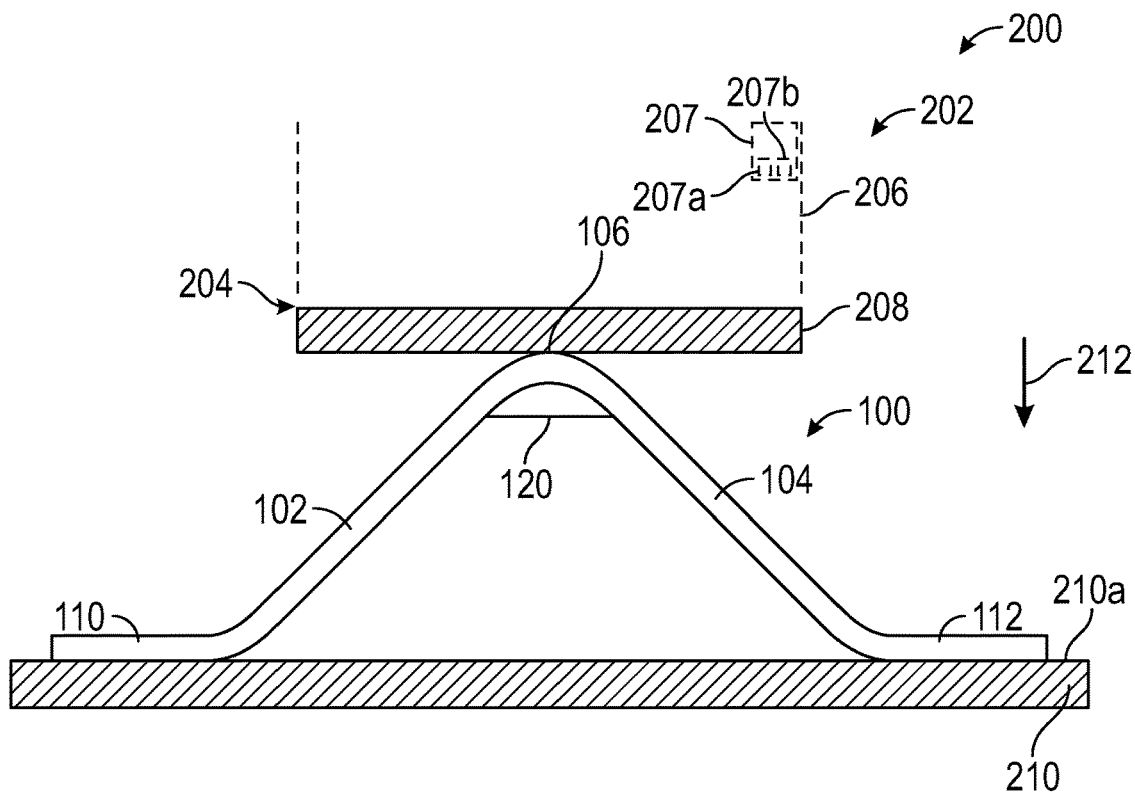
FIG. 10 is a schematic illustration of a system or second test setup for evaluating the rigidity of the angle bracket using the angle bracket coupon of FIG. 1.

In one example, with reference to FIG. 10, the angle bracket coupon 100 is also used in a second test setup 200 to determine the rigidity or ability of the angle bracket coupon 100 having the dart 120 to resist angle change under compression. The second test setup 200 is a second system for evaluating the rigidity of the angle bracket using the angle bracket coupon 100. In one example, the second test setup 200 includes a test system 204, which includes a controller 207, a load cell 206, a first test fixture 208 and a second test fixture 210. The test system 204 comprises, but is not limited to, an MTS® Universal Testing Machine with compression plates, which is commercially available from MTS Systems Corporation of Eden Prairie, MN, USA. In this example, the first test fixture 208 and the second test fixture 210 each comprise hard, flat plates, and the angle bracket coupon 100 is positioned between the first test fixture 208 and the second test fixture 210 such that the first support wing 110 and the second support wing 112 are in contact with or lie on a surface 210a of the second test fixture 210 and the bend 106 is in contact with the first test fixture 208. The second test fixture 210 is fixed relative to the first test fixture 208. The load cell 206 is coupled to the first test fixture 208, and is controllable, via the controller 207 having a processor 207a and a memory 207b, to apply a load to the first test fixture 208 to move the first test fixture 208 relative to the second test fixture 210 while measuring an amount of force applied and the displacement. In one example, the load cell 206 has a load cell capacity of greater than or equal to about 10 kilonewtons (kN) and the first test fixture 208 has a movement speed of about 0.083 millimeters per second (mm/s) for the angle bracket coupon 100 composed of stainless steel. It should be noted that the movement speed is merely exemplary as the movement speed may be increased for crashworthiness validation, for example.

Using the second test setup 200, the first test fixture 208 is moved toward the second test fixture 210 in a first direction 212 and the amount of force applied and the displacement are measured. Based on the movement of the first test fixture 208 in the first direction 212, a graph of force in kilonewtons (kN) (y-axis) versus displacement in millimeters (mm) (x-axis) is generated by the processor 207a of the controller 207 of the test system 204 for the angle bracket coupon 100, which includes a line of the measured performance of the angle bracket coupon 100. As discussed with regard to FIGS. 6-8, the data on the graph may be analyzed by the processor 207a of the controller 207 of the test system 204 to determine the rigidity of the angle bracket coupon 100 under compression by evaluating the slope of the line.

Figure 11:
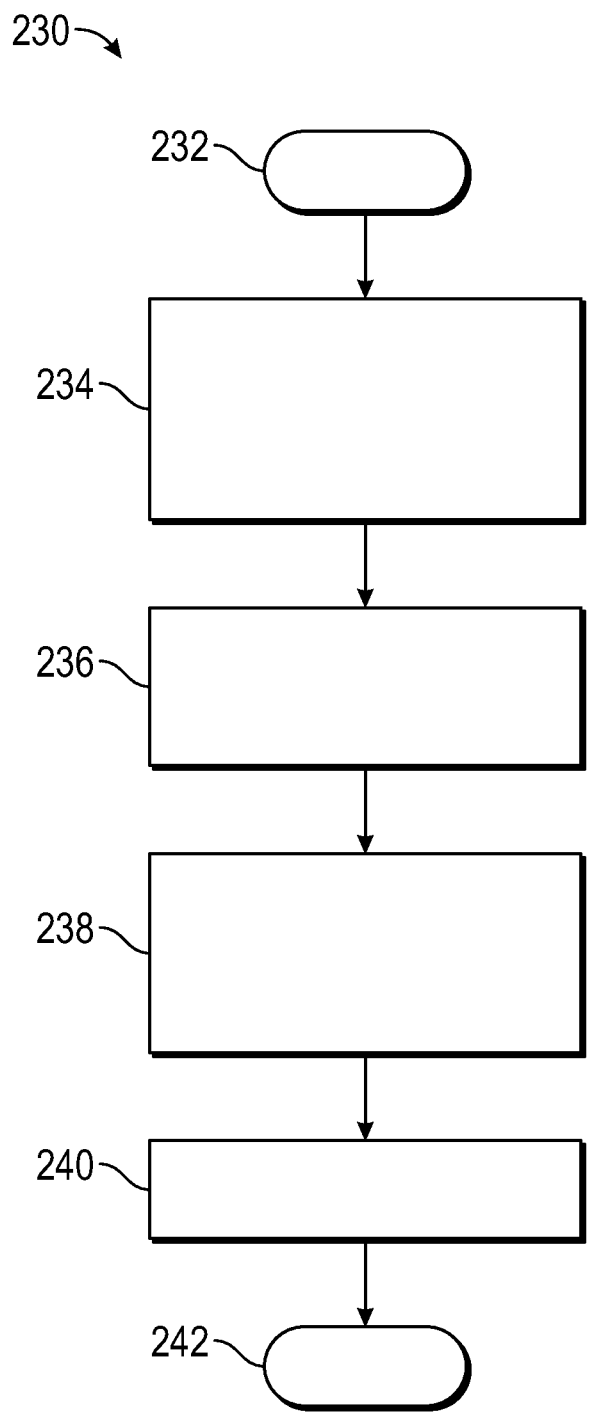
FIG. 11 is a flowchart illustrating a test method that is performed with the second test setup in accordance with various embodiments.

With continuing reference to FIG. 10, and additional reference to FIG. 11, a flowchart illustrates a method of evaluating rigidity or the ability of the angle bracket coupon 100 having the dart 120 to resist angle change under compression using the second test setup 200 or a method 230 of evaluating rigidity or a resistance of angle change under compression. The method begins at 232. At 234, the method includes coupling the angle bracket coupon 100 to the second test fixture 210 such that the angle bracket coupon 100 lies on the surface 210a of the second test fixture 210 and is positioned between the first test fixture 208 and the second test fixture 210. At 236, the method includes moving the first test fixture 208 relative to the second test fixture 210 with the test system 204. The first test fixture 208 is moved in the first direction 212 to determine the rigidity of the angle bracket coupon 100 during folding. At 238, the method includes measuring, via the load cell 206, the force versus displacement applied by the first test fixture 208 during the movement of the first test fixture 208 in the first direction 212. At 240, the method includes outputting the measurement data observed by the load cell 206 at 238, for example, outputting a graph of force in kilonewtons (kN) (y-axis) versus displacement in millimeters (mm) (x-axis) by the processor 207a of the controller 207 of the test system 204, which includes a line representing the performance of the angle bracket coupon 100. The method includes, performing, by the processor 207a of the controller 207 of the test system 204 the linear regression of the data in the graph of force versus displacement. The method includes, determining, by the processor 207a of the controller 207, the displacement end value for the slope calculation, based on a point at which the data from the linear regression is at the predetermined $R^2$ value. The method includes, calculating, by the processor 207a of the controller 207 of the test system 204, the slope of the line on the graph of force versus displacement based on the initial start point of measurement and the end point determined by the linear regression to determine the rigidity of the angle bracket coupon 100. By analyzing the graph of the force versus displacement, the rigidity of the angle bracket coupon 100 having the dart 120, and thus, of the angle bracket associated with the vehicle 98 (FIG. 1) having the dart 120 may be determined. This enables a designer to determine, based on the measurement data for the resistance to angle change under compression whether the dart 120 provides acceptable rigidity for the angle bracket of the vehicle 98 (FIG. 1) based on a predetermined threshold for resistance to angle change for the angle bracket associated with the vehicle 98 (FIG. 1). The method ends at 242. It should be noted that while the method 230 is described herein as using the test system 204, the method 230 may be performed using mechanical simulation software such as Abaqus FEA commercially available from Dassault Systèmes SE of Vélizy-Villacoublay, France or LS-DYNA commercially available from Ansys of Canonsburg, Pennsylvania, USA to determine the resistance of the angle change under compression for the angle bracket coupon 100.

Figure 12:
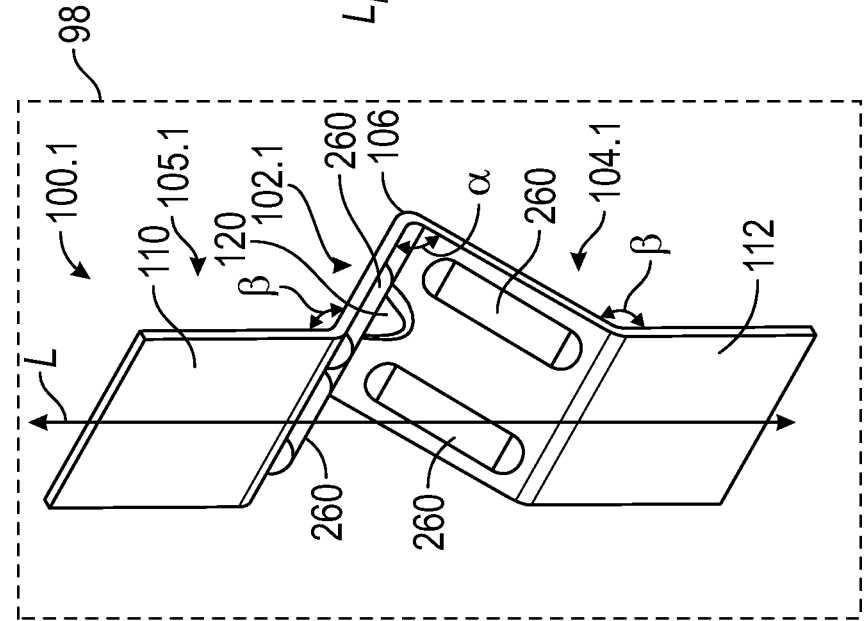
FIG. 12 is a perspective schematic illustration of an exemplary angle bracket coupon having a three-dimensional feature, such as the dart, and at least one bead for evaluating rigidity of an angle bracket for the vehicle, in accordance with various embodiments.

It should be noted that in other examples, the angle bracket coupon 100 may be configured differently for use with the first test setup 150, the test method 180, the second test setup 200 and the second test method 230. For example, with reference to FIG. 12, an angle bracket coupon 100.1 is shown. As the angle bracket coupon 100.1 includes the substantially similar or the same features as the angle bracket coupon 100, the same reference numerals will be used to denote the same features. The angle bracket coupon 100.1 may be employed with the first test setup 150, the test method 180, the second test setup 200 and the second test method 230 to evaluate the rigidity of the angle bracket coupon 100.1. The angle bracket coupon 100.1 includes a first wall 102.1 and a second wall 104.1, which are interconnected at the bend 106 such that the angle α is defined between the first wall 102.1 and the second wall 104.1. The angle bracket coupon 100.1 includes the first support wing 110 coupled to the first wall 102.1, and the second support wing 112 coupled to the second wall 104.1. The first support wing 110 and the second support wing 112 extend outward from the respective one of the first wall 102.1 and the second wall 104.1 along the axis that is substantially parallel to the longitudinal axis L of the angle bracket coupon 100.1. The first wall 102.1 and the second wall 104.1 extend along respective axes that are oblique to the longitudinal axis L. The first support wing 110 and the second support wing 112 extend at the angle β relative to the respective first wall 102.1 and the second wall 104.1. The first support wing 110 and the second support wing 112 provide stability to the angle bracket coupon 100.1 during an application of a load during testing. The first wall 102.1, the second wall 104.1 and the angle α defined between the first wall 102.1 and the second wall 104.1 are configured to correspond to an exemplary angle bracket, such as an angle bracket for use with the vehicle 98. Generally, the angle bracket coupon 100.1 simulates the angle bracket for the vehicle 98 such that the performance of the angle bracket coupon 100.1 during the testing methods discussed herein is a representation of the performance of the angle bracket for the vehicle 98. In this example, the angle bracket coupon 100.1 is composed of a metal or metal alloy, such as stainless steel, however, the angle bracket coupon 100.1 may be composed of any suitable material, including, but not limited to polymers, metals, metal alloys, etc.

In this example, the first wall 102.1 and the second wall 104.1 are illustrated and described herein as comprising beads 260. The beads 260 are defined through a second side 105.1 of the angle bracket coupon 100.1 to extend outward from a first coupon side 103.1 of the angle bracket coupon 100.1. The first coupon side 103.1 is opposite the second coupon side 105.1. In one example, the angle bracket coupon 100.1 includes four beads 260, however, the angle bracket coupon 100.1 may have any number of beads 260. Further, while the angle bracket coupon 100.1 is shown with two beads 260 on the first wall 102.1 and two beads 260 on the second wall 104.1, the first wall 102.1 or the second wall 104.1 may have a single bead 260. Further, one of the first wall 102.1 and the second wall 104.1 may include bead(s) 260 while the other first wall 102.1 and the second wall 104.1 is devoid of beads. In one example, each of the beads 260 is the same, however, each of the beads 260 may be different. Each bead 260 is generally in the shape of an elongated oval, but the beads 260 may have any desired shape.

Figure 14:
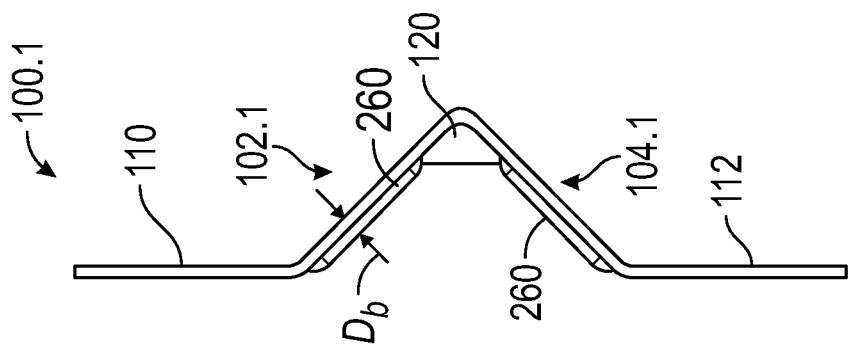
FIG. 14 is a side view of the angle bracket coupon of FIG. 12.
Figure 13:
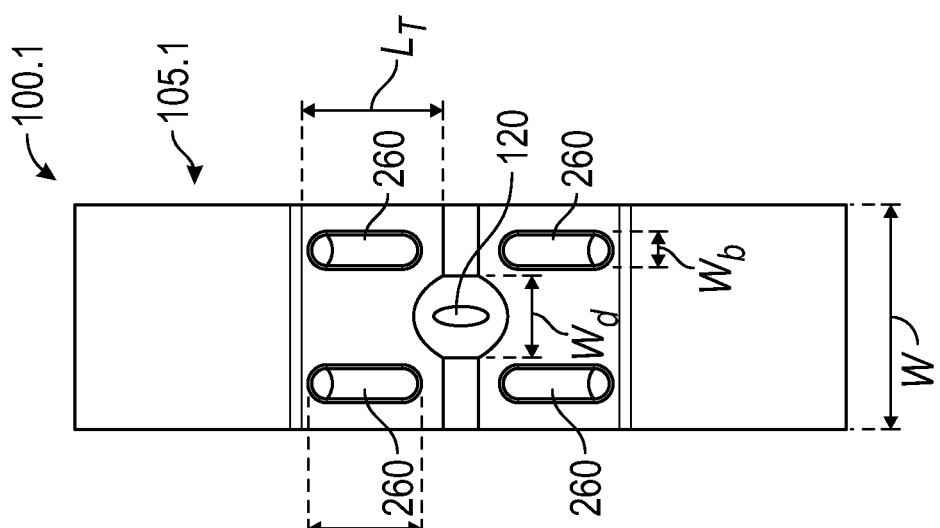
FIG. 13 is a back view of the angle bracket coupon of FIG. 12.

With reference to FIG. 13, each bead 260 has a bead length $L_b$ that ranges from about 0.1 multiplied by the length $L_T$ of the first wall 102.1 or second wall 104.1 of the angle bracket coupon 100.1 to about 0.9 multiplied by the length $L_T$ of the first wall 102.1 or second wall 104.1 of the angle bracket coupon 100.1. Thus, the bead length $L_b$ is about 4 millimeters (mm) to about 36 millimeters (mm). Each bead 260 has a bead width $W_b$ that ranges from about 0.1 multiplied by the difference between the width W of the angle bracket coupon 100.1 and the dart width $W_d$ to about 0.4 multiplied by the difference between the width W of the angle bracket coupon 100.1 and the dart width $W_d$. Thus, the bead width $W_b$ is about 2 millimeters (mm) to about 8 millimeters (mm). With reference to FIG. 14, each bead 260 has a bead depth $D_b$ that ranges from about 0.25 times the bead width $W_b$ to about the bead width $W_b$. Thus, the bead depth $D_b$ is about 0.5 millimeters (mm) to about 8 millimeters (mm).

In this example, the angle bracket coupon 100.1 also includes the three-dimensional feature or the dart 120 formed between the first wall 102.1 and the second wall 104.1 at the bend 106. In one example, each bead 260 may be integrally formed in the angle bracket coupon 100.1, via stamping for example, and the dart 120 may be integrally formed with the angle bracket coupon 100.1, via press brake operations, stamping using a uniquely designed die and punch set, bend forming, additive manufacturing, casting, etc. In other embodiments, the angle bracket coupon 100.1 may be formed as a coupon having the first wall 102.1 and the second wall 104.1 straight (or planar) to each other and without the bead(s) 260 via stamping, casting, machining, etc., and the beads 260, the dart 120 and the bend 106 may be formed through a suitable secondary process, such as stamping. It should be noted that the placement and size of the bead(s) 260 may be predetermined so as to not interfere with the bend 106 or the dart 120.

It should be noted that in other examples, the angle bracket coupon 100 may be configured differently for use with the first test setup 150, the test method 180, the second test setup 200 and the second test method 230. For example, with reference to FIG. 15, an angle bracket coupon 100.2 is shown. As the angle bracket coupon 100.2 includes the substantially similar or the same features as the angle bracket coupon 100, the same reference numerals will be used to denote the same features. The angle bracket coupon 100.2 may be employed with the first test setup 150, the test method 180, the second test setup 200 and the second test method 230 to evaluate the rigidity of the angle bracket coupon 100.2. The angle bracket coupon 100.2 includes a first wall 102.2 and a second wall 104.2, which are interconnected at the bend 106 such that the angle α is defined between the first wall 102.2 and the second wall 104.2. The angle bracket coupon 100.2 includes the first support wing 110 coupled to the first wall 102.2, and the second support wing 112 coupled to the second wall 104.2. The first support wing 110 and the second support wing 112 extend outward from the respective one of the first wall 102.2 and the second wall 104.2 along the axis that is substantially parallel to the longitudinal axis L of the angle bracket coupon 100.2. The first wall 102.2 and the second wall 104.2 extend along respective axes that are oblique to the longitudinal axis L. The first support wing 110 and the second support wing 112 extend at the angle β relative to the respective first wall 102.2 and the second wall 104.2. The first support wing 110 and the second support wing 112 provide stability to the angle bracket coupon 100.2 during an application of a load during testing, as will be discussed. The first wall 102.2, the second wall 104.2 and the angle α defined between the first wall 102.2 and the second wall 104.2 are configured to correspond to an exemplary angle bracket, such as an angle bracket for use with the vehicle 98. Generally, the angle bracket coupon 100.2 simulates the angle bracket for the vehicle 98 such that the performance of the angle bracket coupon 100.2 during the testing methods discussed herein is a representation of the performance of the angle bracket for the vehicle 98. In this example, the angle bracket coupon 100.2 is composed of a metal or metal alloy, such as stainless steel, however, the angle bracket coupon 100.2 may be composed of any suitable material, including, but not limited to polymers, metals, metal alloys, etc.

In this example, the first wall 102.2 and the second wall 104.2 are illustrated and described herein as comprising bars 270. The bars 270 extend from a second coupon side 105.2 of the angle bracket coupon 100.2, and the first coupon side 103 is opposite the second coupon side 105.2. In one example, with reference to FIG. 16, the angle bracket coupon 100.2 includes four bars 270, however, the angle bracket coupon 100.2 may have any number of bars 270. Further, while the angle bracket coupon 100.2 is shown with two bars 270 on the first wall 102.2 and two bars 270 on the second wall 104.2, the first wall 102.2 or the second wall 104.2 may have a single bar 270. Further, one of the first wall 102.2 and the second wall 104.2 may include bar(s) 270 while the other first wall 102.2 and the second wall 104.2 is devoid of bars 270. In one example, each of the bars 270 is the same, however, each of the bars 270 may be different. Each bar 270 is generally in the shape of a rectangle, but the bars 270 may have any desired shape.

With reference to FIG. 13, each bar 270 has a bar length $L_e$ that ranges from about 0.1 multiplied by the length $L_T$ of the first wall 102.2 or second wall 104.2 of the angle bracket coupon 100.2 to about 0.9 multiplied by the length $L_T$ of the first wall 102.2 or second wall 104.2 of the angle bracket coupon 100.2. Thus, the bar length $L_e$ is about 4 millimeters (mm) to about 36 millimeters (mm). Each bar 270 has a bar width $W_e$ that ranges from about 0.1 multiplied by the difference between the width W of the angle bracket coupon 100.2 and the dart width $W_d$ to about 0.4 multiplied by the difference between the width W of the angle bracket coupon 100.2 and the dart width $W_d$. Thus, the bar width $W_e$ is about 2 millimeters (mm) to about 8 millimeters (mm). With reference to FIG. 17, each bar 270 has a bar thickness $T_e$ that ranges from about 0.25 times the bar width $W_e$ to about the bar width $W_e$. Thus, the bar thickness $T_e$ is about 0.5 millimeters (mm) to about 8 millimeters (mm).

In this example, the angle bracket coupon 100.2 also includes the three-dimensional feature or the dart 120 formed between the first wall 102.2 and the second wall 104.2 at the bend 106. In one example, the dart 120 may be integrally formed with the angle bracket coupon 100.2, via press brake operations, stamping using a uniquely designed die and punch set, bend forming, additive manufacturing, casting, etc. The bar(s) 270 may be integrally formed with the angle bracket coupon 100.2, or may be coupled to the angle bracket coupon 100.2 via welding, adhesives, fasteners, etc. In other embodiments, the angle bracket coupon 100.2 may be formed as a coupon having the first wall 102.2 and the second wall 104.2 straight (or planar) to each other and without the bar(s) 270 via stamping, casting, machining, etc. and the dart 120 and the bend 106 may be formed through a suitable secondary process, such as stamping. The bar(s) 270 may be coupled to the angle bracket coupon 100.2 via welding, adhesives, fasteners, etc. It should be noted that the placement and size of the bar(s) 270 may be predetermined so as to not interfere with the bend 106 or the dart 120.

Figure 18:
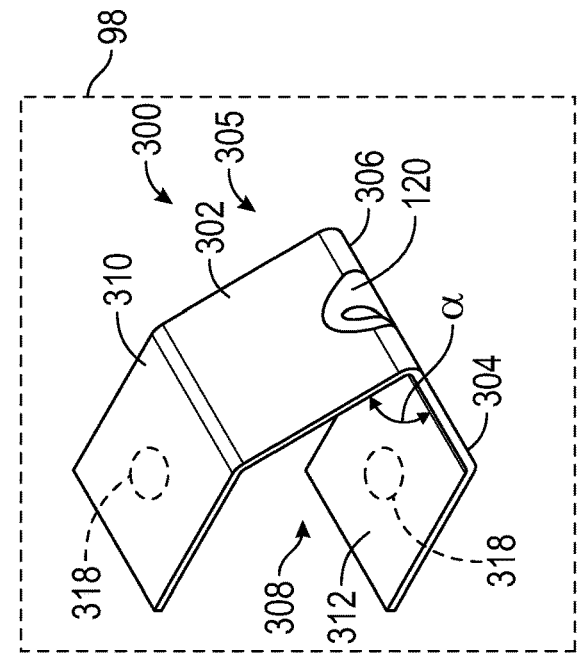
FIG. 18 is a perspective schematic illustration of an exemplary angle bracket coupon having a three-dimensional feature, such as the dart, for evaluating rigidity of an angle bracket for the vehicle, in accordance with various embodiments.

With reference to FIG. 18, an exemplary second angle bracket test coupon or second angle bracket coupon 300 is shown. As will be discussed, the second angle bracket coupon 300 may be employed with one or more testing methods to evaluate the rigidity of the angle bracket associated with the vehicle 98 having the dart 120. In this regard, the second angle bracket coupon 300 is employed with different test methods to determine the rigidity of the angle bracket including the dart 120. As the dart 120 formed in the angle bracket coupon 100 and the second angle bracket coupon 300 is the same in this example, and features of the angle bracket coupon 100 and the second angle bracket coupon 300 are substantially the same or the same, the same reference numerals will be used to denote the same or substantially the same features. The second angle bracket coupon 300 includes a first wall 302 and a second wall 304, which are interconnected at a bend 306 such that the angle α is defined between the first wall 302 and the second wall 304. In this example, the second angle bracket coupon 300 includes a first support wing 310 coupled to the first wall 302, and a second support wing 312 coupled to the second wall 304. The first support wing 310 and the second support wing 312 extend outward from the respective one of the first wall 302 and the second wall 304 along an axis that is substantially parallel to a longitudinal axis L3 of the second angle bracket coupon 300. The first wall 302 and the second wall 304 extend along respective axes that are oblique to the longitudinal axis L3. In one example, the first support wing 310 and the second support wing 312 extend at an angle β3 relative to the respective first wall 302 and the second wall 304. In this example, angle β3 is determined by:

$$\beta_3 = 180 \text{ degrees} - \frac{\alpha}{2} \tag{1}$$

Wherein α is the angle α defined between the first wall 302 and the second wall 304 in degrees; and angle β3 is in degrees. The first support wing 310 and the second support wing 312 may be considered horizontal support wings. The first support wing 310 and the second support wing 312 provide stability to the second angle bracket coupon 300 during an application of a load during testing. The second angle bracket coupon 300 forms a substantially C-shape. The first wall 302, the second wall 304 and the angle α defined between the first wall 302 and the second wall 304 are configured to correspond to an exemplary angle bracket, such as the angle bracket for use with the vehicle 98. Generally, the second angle bracket coupon 300 simulates the angle bracket for the vehicle 98 such that the performance of the second angle bracket coupon 300 during the testing methods discussed herein is representative of the performance of the angle bracket for the vehicle 98. In this example, the second angle bracket coupon 300 is composed of a metal or metal alloy, such as stainless steel, however, the second angle bracket coupon 300 may be composed of any suitable material, including, but not limited to, polymers, metals, metal alloys, etc. In this example, the first wall 302 and the second wall 104 are illustrated and described herein as comprising smooth, flat or planar walls, however, it should be noted that the first wall 302 and the second wall 304 may include three-dimensional features, such as a slot, curvature, etc. Thus, the first wall 302 and the second wall 304 are merely examples.

In this example, the second angle bracket coupon 300 also includes the three-dimensional feature or the dart 120 formed between the first wall 302 and the second wall 304 at the bend 306. Generally, the dart 120 is defined as a projection of the second angle bracket coupon 300 inward or in a direction toward the first support wing 310 and the second support wing 312 to provide a support that extends between the first wall 302 and the second wall 304. Stated another way, the second angle bracket coupon 300 has a first coupon side 303 opposite a second coupon side 305. The dart 120 is defined through the second coupon side 305 to extend outwardly from the first coupon side 303. In this example, each of the first coupon side 303 and the second coupon side 305 are substantially smooth. In one example, the dart 120 may be integrally formed with the second angle bracket coupon 300, via press brake operations, stamping using a uniquely designed die and punch set, bend forming, additive manufacturing, casting, etc. In other embodiments, the second angle bracket coupon 300 may be formed as a coupon having the first wall 302 and the second wall 304 straight (or planar) to each other and without the dart 120 via stamping, casting, machining, etc. and the dart 120 and the bend 306 may be formed through a suitable secondary process, such as stamping. In this example, a single dart 120 is shown, however, the second angle bracket coupon 300 may have any number of darts 120.

Figure 20:
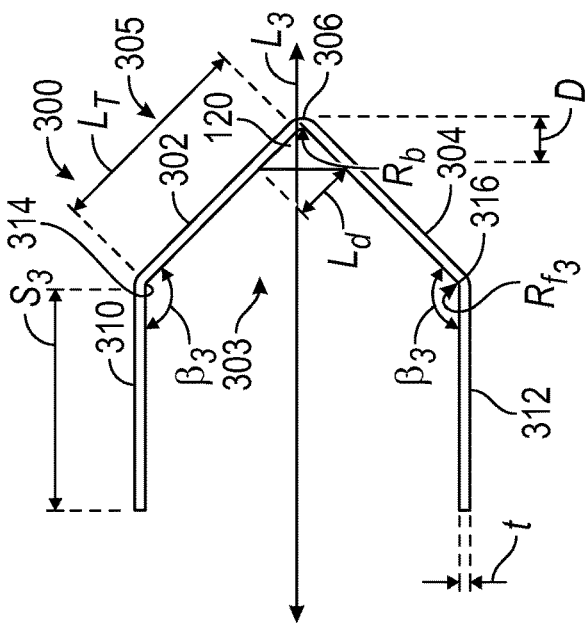
FIG. 20 is a side view of the angle bracket coupon of FIG. 18.
Figure 19:
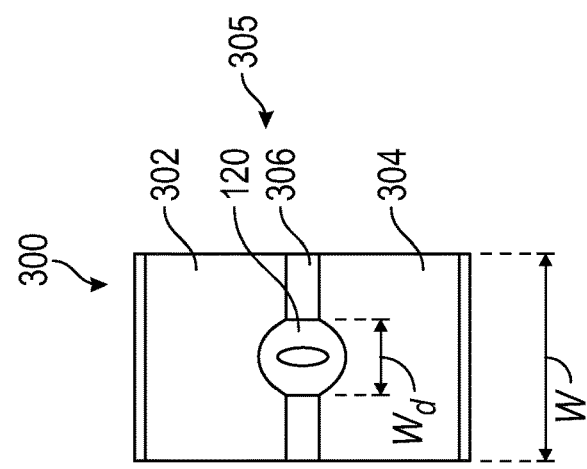
FIG. 19 is a back view of the angle bracket coupon of FIG. 18.
Figure 21:
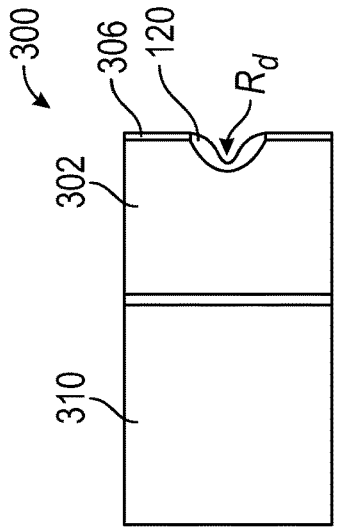
FIG. 21 is a top view of the angle bracket coupon of FIG. 18.

In one example, with reference to FIG. 19, the dart 120 has the predetermined width $W_d$. The second angle bracket coupon 300 has the width W, which is about equal to the width $W_d$ of the dart 120 (as a minimum) to about the width $W_d$ of the dart 120 multiplied by three (as a maximum). The bend 306 also has the predetermined bend radius Rb. With reference to FIG. 20, the dart 120 also has the predetermined dart length $L_d$, which is defined as the distance between an intersection between a first end the dart 120 and the first wall 302, and an intersection of a second, opposite end of the dart 120 and the second wall 304. The dart 120 also has the predetermined depth D. For the second angle bracket coupon 300 having straight walls, such as the first wall 302 and the second wall 304, each of the first wall 302 and the second wall 304 has the length $L_T$, which is about the dart length $L_d$ (as a minimum) to about the dart length $L_d$ multiplied by six (as a maximum). In addition, each of the first support wing 310 and the second support wing 312 of the angle bracket coupon 100 has a support wing length S3 of about 25 millimeters (mm) to about 100 millimeters (mm). The second angle bracket coupon 300 also has the thickness t. In addition, the second angle bracket coupon 300 may also have a first fillet 314 defined between the first wall 302 and the first support wing 310, and a second fillet 316 defined between the second wall 304 and the second support wing 312. The first fillet 314 and the second fillet 316 may each have a radius of fillet $R_{f3}$, which in one example is about 2.0 millimeters (mm) to about 4.0 millimeters (mm). With reference to FIG. 21, the dart 120 also has the predetermined dart radius Rd, which is about 1.0 millimeters (mm) to about 5.0 millimeters (mm). In one example, with reference to FIG. 22, each of the first support wing 310 and the second support wing 312 include a hole 318. The hole 318 enables a mechanical fastener, such as a bolt, screw, or the like, to be received through the hole 318 to couple the respective one of the first support wing 310 and the second support wing 312 to a test system 352.

Figure 22:
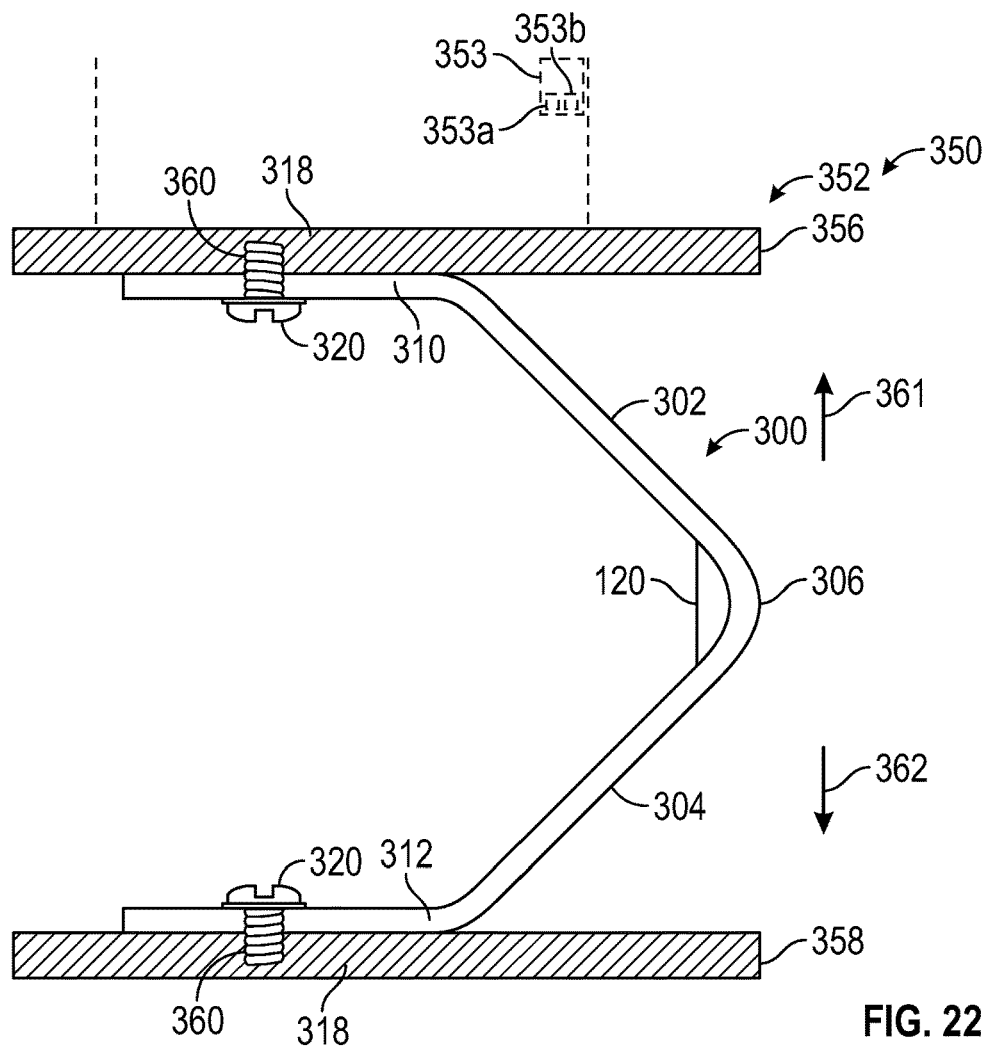
FIG. 22 is a schematic illustration of a system or third test setup for evaluating the rigidity of the angle bracket using the angle bracket coupon of FIG. 18.

In one example, with continued reference to FIG. 22, the second angle bracket coupon 300 is used in a third test setup 350 to evaluate the rigidity or ability of the second angle bracket coupon 300 having the dart 120 to resist angle change under tension. The third test setup 350 is a third system for evaluating the rigidity of the angle bracket using the second angle bracket coupon 300. In one example, the third test setup 350 includes the test system 352, which includes a controller 353, a load cell 354, a first test fixture 356 and a second test fixture 358. The test system 352 comprises, but is not limited to, an MTS® Universal Testing Machine with compression plates, which is commercially available from MTS Systems Corporation of Eden Prairie, MN, USA. In this example, the first test fixture 356 and the second test fixture 358 each comprise a hard, flat plate, which includes a threaded bore 360 for removably coupling to a respective one of the first support wing 310 and the second support wing 312. In this example, the bolt 320 is inserted through the hole 318 of the respective first support wing 310 and second support wing 312, and engages with the threaded bore 360 of the respective first test fixture 356 and second test fixture 358. It should be noted that in other embodiments, adhesives may be used in place of mechanical fasteners or bolts 320 to couple the second angle bracket coupon 300 to the first test fixture 356 and the second test fixture 358. The second test fixture 358 is fixed relative to the first test fixture 356. The load cell 354 is coupled to the first test fixture 356, and is controllable, via the controller 353 having a processor 353a and a memory 353b, to apply a load to the first test fixture 356 to move the first test fixture 356 relative to the second test fixture 358 while measuring an amount of force applied and the displacement. In one example, the load cell 354 has a load cell capacity of greater than or equal to about 25 kilonewtons (kN) and the first test fixture 356 has a movement speed of about 0.083 millimeters per second (mm/s) for the second angle bracket coupon 300 composed of stainless steel. It should be noted that the movement speed is merely exemplary as the movement speed may be increased for crashworthiness validation, for example.

Using the third test setup 350, the first test fixture 356 is moved away from the second test fixture 358 in a first direction 361 and the amount of force applied and the displacement are measured. Based on the movement of the first test fixture 356 in the first direction 361, a graph of force in kilonewtons (kN) (y-axis) versus displacement in millimeters (mm) (x-axis) is generated by the processor 353a of the controller 353 of the test system 352 for the second angle bracket coupon 300, which includes a line of the measured performance of the second angle bracket coupon 300. As discussed with regard to FIGS. 6-8, the data on the graph may be analyzed by the processor 353a of the controller 353 of the test system 352 to determine the rigidity of the second angle bracket coupon 300 under tension by evaluating the slope of the line. In addition, a turning point of the line on the graph of force versus displacement may also provide the maximum load bearing capacity of the second angle bracket coupon 300 during flattening. In an instance where it is desired to determine an energy absorption performance of the second angle bracket coupon 300, for example, a crashworthiness test, an area under the force versus displacement curve may be calculated to evaluate the energy absorption capability of the second angle bracket coupon 300.

Using the third test setup 350, the first test fixture 356 is moved toward the second test fixture 358 in a second direction 362 and the amount of force applied and the displacement are measured. Based on the movement of the first test fixture 356 in the second direction 362, a graph of force in kilonewtons (kN) (y-axis) versus displacement in millimeters (mm) (x-axis) is generated by the processor 353a of the controller 353 of the test system 352 for the second angle bracket coupon 300 to determine the rigidity of the second angle bracket coupon 300. As discussed with regard to FIGS. 6-8, the data on the graph may be analyzed by the processor 353a of the controller 353 of the test system 352 to determine the rigidity of the second angle bracket coupon 300 under compression by evaluating the slope of the line. In addition, the apex of the graph of force versus displacement provides the load bearing capacity of the second angle bracket coupon 300 during folding. In an instance where it is desired to determine an energy absorption performance of the second angle bracket coupon 300, for example, a crashworthiness test, an area under the force versus displacement curve may be calculated to evaluate the energy absorption capability of the second angle bracket coupon 300.

Figure 23:
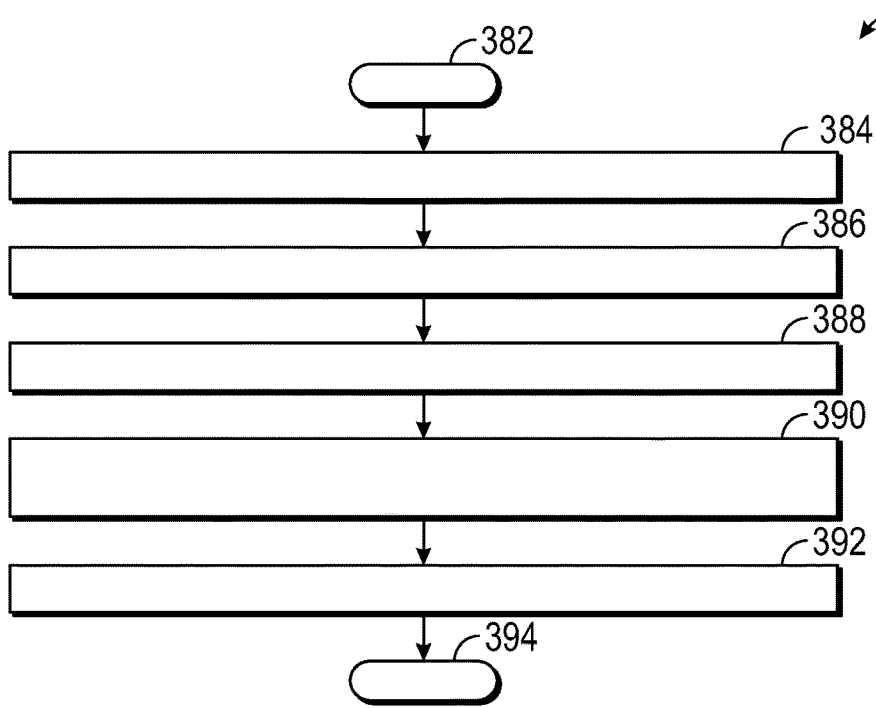
FIG. 23 is a flowchart illustrating a test method that is performed with the third test setup in accordance with various embodiments.

With continuing reference to FIG. 22, and additional reference to FIG. 23, a flowchart illustrates a method of evaluating the rigidity or the ability of the second angle bracket coupon 300 having the dart 120 to resist angle change using the third test setup 350 or a method 380 of evaluating rigidity or a resistance of angle change under tension or compression. The method begins at 382. At 384, the method includes coupling the first support wing 310 of the second angle bracket coupon 300 to the first test fixture 356 via engaging the bolt 320 with the threaded bore 360. At 386, the method includes coupling the second support wing 312 of the second angle bracket coupon 300 to the second test fixture 358 via engaging the bolt 320 with the threaded bore 360. Alternatively, adhesives may be used to couple the first support wing 310 and the second support wing 312 to the respective first test fixture 356 and second test fixture 358. At 388, the method includes moving the first test fixture 356 relative to the second test fixture 358 with the test system 352. The first test fixture 356 is moved in the first direction 361 to determine the rigidity of the second angle bracket coupon 300 during flattening or is moved in the second direction 362 to determine the rigidity of the second angle bracket coupon 300 during folding. At 390, the method includes measuring, via the load cell 354, the displacement of the second angle bracket coupon 300 versus the force applied by the first test fixture 356 during the movement of the first test fixture 356 in the first direction 361 or the second direction 362. At 392, the method includes outputting the measurement data observed by the load cell 354 at 390, for example, outputting a graph of force in kilonewtons (kN) (y-axis) versus displacement in millimeters (mm) (x-axis), respectively, for the movement along the first direction 361 or the second direction 362 by the processor 353a of the controller 353 of the test system 352, which includes a line representing the performance of the second angle bracket coupon 300. The method includes, performing, by the processor 353a of the controller 353 of the test system 352 the linear regression of the data in the graph of force versus displacement. The method includes determining, by the processor 353a of the controller 353, the displacement end value for the slope calculation, based on a point at which the data from the linear regression is at the predetermined $R^2$ value. The method includes, calculating, by the processor 353a of the controller 353 of the test system 352, the slope of the line on the graph of force versus displacement based on the initial start point of measurement and the end point determined by the linear regression to determine the rigidity of the second angle bracket coupon 300. By analyzing the graph of the force versus displacement, the rigidity of the second angle bracket coupon 300 having the dart 120, and thus, of the angle bracket associated with the vehicle 98 (FIG. 8) having the dart 120 may be determined. This enables a designer to determine, based on the measurement data for the resistance to angle change under tension or compression whether the dart 120 provides acceptable rigidity for the angle bracket of the vehicle 98 (FIG. 8) based on a predetermined threshold for resistance to angle change for the angle bracket associated with the vehicle 98 (FIG. 8). The method ends at 394. It should be understood that the method 380 is repeated to obtain data for the force versus displacement for the movement of the second angle bracket coupon 300 in both the first direction 361 and the second direction 362. Further, it should be noted that while the method 380 is described herein as using the test system 352, the method 380 may be performed using mechanical simulation software such as Abaqus FEA commercially available from Dassault Systèmes SE of Vélizy-Villacoublay, France or LS-DYNA commercially available from Ansys of Canonsburg, Pennsylvania, USA to determine the resistance of the angle change under tension for the second angle bracket coupon 300.

Figure 25:
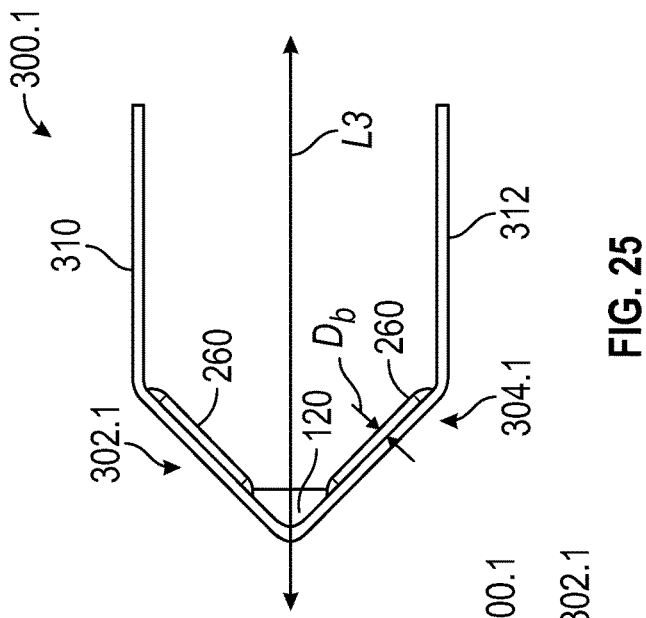
FIG. 25 is a side view of the angle bracket coupon of FIG. 24.
Figure 24:
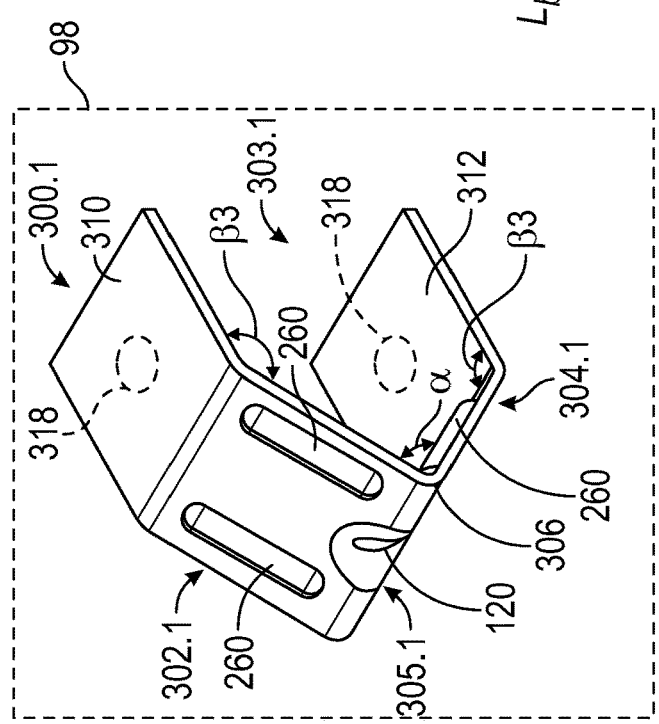
FIG. 24 is a perspective schematic illustration of an exemplary angle bracket coupon having a three-dimensional feature, such as the dart, and at least one bead for evaluating rigidity of an angle bracket for the vehicle, in accordance with various embodiments.

It should be noted that in other examples, the second angle bracket coupon 300 may be configured differently for use with the third test setup 350 and test method 380. For example, with reference to FIG. 24, a second angle bracket coupon 300.1 is shown. As the second angle bracket coupon 300.1 includes the substantially similar or the same features as the second angle bracket coupon 300, the same reference numerals will be used to denote the same features. The second angle bracket coupon 300.1 may be employed with the third test setup 350 and the test method 380 to evaluate the rigidity of the second angle bracket coupon 300.1. The second angle bracket coupon 300.1 includes a first wall 302.1 and a second wall 304.1, which are interconnected at the bend 306 such that the angle α is defined between the first wall 302.1 and the second wall 304.1. In this example, the second angle bracket coupon 300.1 includes the first support wing 310 coupled to the first wall 302.1, and the second support wing 312 coupled to the second wall 304.1. The first support wing 310 and the second support wing 312 extend outward from the respective one of the first wall 302.1 and the second wall 304.1 along an axis that is substantially parallel to the longitudinal axis L3 (FIG. 25) of the second angle bracket coupon 300.1. The first wall 302.1 and the second wall 304.1 extend along respective axes that are oblique to the longitudinal axis L3 (FIG. 25). In one example, the first support wing 310 and the second support wing 312 extend at the angle β3 relative to the respective first wall 302.1 and the second wall 304.1. The second angle bracket coupon 300.1 forms a substantially C-shape. The first wall 302.1, the second wall 304.1 and the angle α defined between the first wall 302.1 and the second wall 304.1 are configured to correspond to an exemplary angle bracket, such as the angle bracket for use with the vehicle 98. Generally, the second angle bracket coupon 300.1 simulates the angle bracket for the vehicle 98 such that the performance of the second angle bracket coupon 300.1 during the testing methods discussed herein is representative of the performance of the angle bracket for the vehicle 98. In this example, the second angle bracket coupon 300.1 is composed of a metal or metal alloy, such as stainless steel, however, the second angle bracket coupon 300.1 may be composed of any suitable material, including, but not limited to polymers, metals, metal alloys, etc.

In this example, the first wall 302.1 and the second wall 304.1 are illustrated and described herein as comprising the beads 260. The beads 260 are defined through a second side 305.1 of the second angle bracket coupon 300.1 to extend outward from a first coupon side 303.1 of the second angle bracket coupon 300.1. The first coupon side 303.1 is opposite the second coupon side 305.1. In one example, the angle bracket coupon 300.1 includes four beads 260, however, the second angle bracket coupon 300.1 may have any number of beads 260. Further, while the second angle bracket coupon 300.1 is shown with two beads 260 on the first wall 302.1 and two beads 260 on the second wall 304.1, the first wall 302.1 or second wall 304.1 may have a single bead 260. Further, one of the first wall 302.1 and the second wall 304.1 may include bead(s) 260 while the other first wall 302.1 and the second wall 304.1 is devoid of beads 260. In one example, each of the beads 260 is the same, however, each of the beads 260 may be different. Each bead 260 is generally in the shape of an elongated oval, but the beads 260 may have any desired shape.

Figure 26:
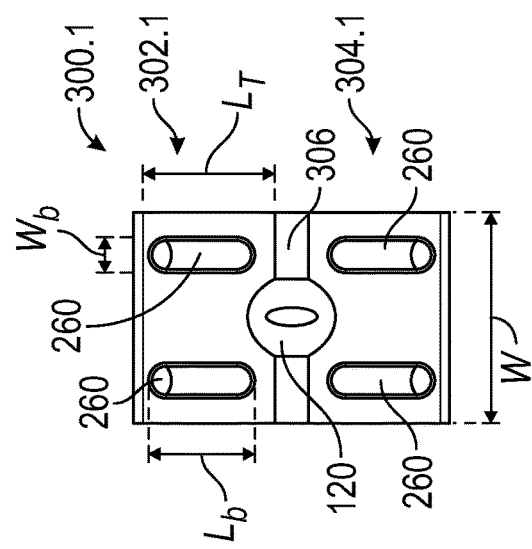
FIG. 26 is a back view of the angle bracket coupon of FIG. 24.

With reference to FIG. 26, each bead 260 has the bead length $L_b$ that ranges from about 0.1 multiplied by the length $L_T$ of the first wall 302.1 or second wall 304.1 of the second angle bracket coupon 300.1 to about 0.9 multiplied by the length $L_T$ of the first wall 302.1 or second wall 304.1 of the second angle bracket coupon 300.1. Each bead 260 has a bead width $W_b$ that ranges from about 0.1 multiplied by the difference between the width W of the second angle bracket coupon 300.1 and the dart width $W_d$ to about 0.4 multiplied by the difference between the width W of the second angle bracket coupon 300.1 and the dart width $W_d$. With reference to FIG. 25, each bead 260 has a bead depth $D_b$ that ranges from about 0.25 times the bead width $W_b$ to about the bead width $W_b$.

In this example, the second angle bracket coupon 300.1 also includes the three-dimensional feature or the dart 120 formed between the first wall 302.1 and the second wall 304.1 at the bend 306. In one example, each bead 260 may be integrally formed in the second angle bracket coupon 300.1, via stamping for example, and the dart 120 may be integrally formed with the second angle bracket coupon 300.1 via press brake operations, stamping using a uniquely designed die and punch set, bend forming, additive manufacturing, casting, etc. In other embodiments, the second angle bracket coupon 300.1 may be formed as a coupon having the first wall 302.1 and the second wall 304.1 straight (or planar) to each other and without the bead(s) 260 via stamping, casting, machining, etc. and the beads 260, the dart 120 and the bend 306 may be formed through a suitable secondary process, such as stamping. It should be noted that the placement and size of the bead(s) 260 may be predetermined so as to not interfere with the bend 306 or the dart 120.

Figure 28:
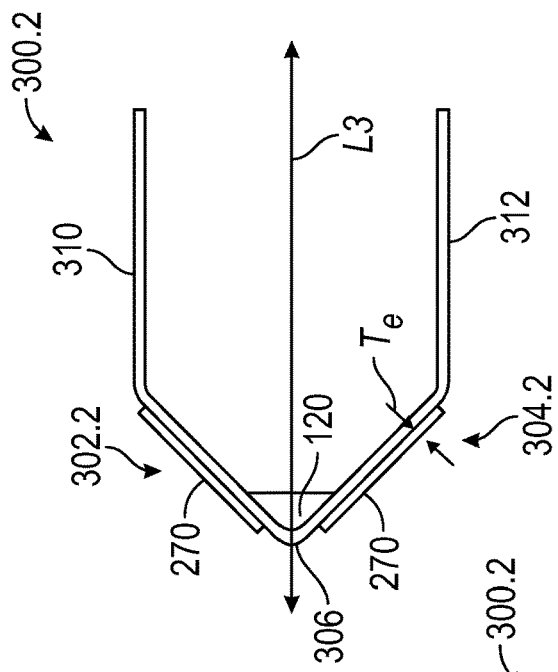
FIG. 28 is a side view of the angle bracket coupon of FIG. 27.
Figure 27:
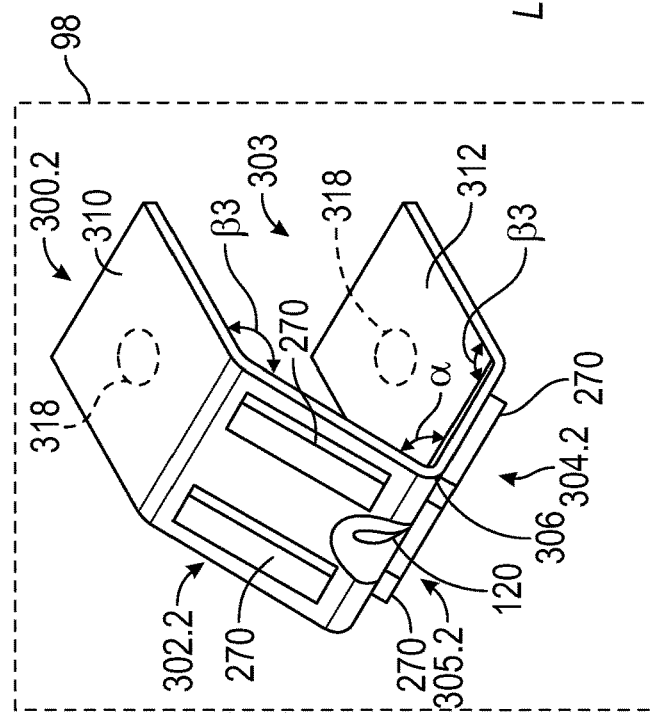
FIG. 27 is a perspective schematic illustration of another exemplary angle bracket coupon having a three-dimensional feature, such as the dart, and at least one bar for evaluating rigidity of the angle bracket for the vehicle in accordance with various embodiments.

It should be noted that in other examples, the second angle bracket coupon 300 may be configured differently for use with the third test setup 350 and test method 380. For example, with reference to FIG. 27, a second angle bracket coupon 300.2 is shown. As the second angle bracket coupon 300.2 includes the substantially similar or the same features as the second angle bracket coupon 300, the same reference numerals will be used to denote the same features. The second angle bracket coupon 300.2 may be employed with the third test setup 350 and the test method 380 to evaluate the rigidity of the second angle bracket coupon 300.2. The second angle bracket coupon 300.2 includes a first wall 302.2 and a second wall 304.2, which are interconnected at the bend 306 such that the angle α is defined between the first wall 302.2 and the second wall 304.2. In this example, the second angle bracket coupon 300.2 includes the first support wing 310 coupled to the first wall 302.2, and the second support wing 312 coupled to the second wall 304.2. The first support wing 310 and the second support wing 312 extend outward from the respective one of the first wall 302.2 and the second wall 304.2 along an axis that is substantially parallel to the longitudinal axis L3 (FIG. 28) of the second angle bracket coupon 300.2. The first wall 302.2 and the second wall 304.2 extend along respective axes that are oblique to the longitudinal axis L3 (FIG. 28). In one example, the first support wing 310 and the second support wing 312 extend at the angle β3 relative to the respective first wall 302.2 and the second wall 304.2. The second angle bracket coupon 300.2 forms a substantially C-shape. The first wall 302.2, the second wall 304.2 and the angle α defined between the first wall 302.2 and the second wall 304.2 are configured to correspond to an exemplary angle bracket, such as the angle bracket for use with the vehicle 98. Generally, the second angle bracket coupon 300.2 simulates the angle bracket for the vehicle 98 such that the performance of the second angle bracket coupon 300.2 during the testing methods discussed herein is representative of the performance of the angle bracket for the vehicle 98. In this example, the second angle bracket coupon 300.2 is composed of a metal or metal alloy, such as stainless steel, however, the second angle bracket coupon 300.2 may be composed of any suitable material, including, but not limited to polymers, metals, metal alloys, etc.

In this example, the first wall 302.2 and the second wall 304.2 are illustrated and described herein as comprising the bars 270. The bars 270 extend from a second coupon side 305.2 of the second angle bracket coupon 300.2, and the first coupon side 303 is opposite the second coupon side 305.2. In one example, with reference to FIG. 29, the second angle bracket coupon 300.2 includes four bars 270, however, the second angle bracket coupon 300.2 may have any number of bars 270. Further, while the second angle bracket coupon 300.2 is shown with two bars 270 on the first wall 302.2 and two bars 270 on the second wall 304.2, the first wall 302.2 or the second wall 304.2 may have a single bar 270. Further, one of the first wall 302.2 and the second wall 304.2 may include bar(s) 270 while the other first wall 302.2 and the second wall 304.2 is devoid of bars 270. In one example, each of the bars 270 is the same, however, each of the bars 270 may be different. Each bar 270 is generally in the shape of a rectangle, but the bars 270 may have any desired shape.

Figure 29:
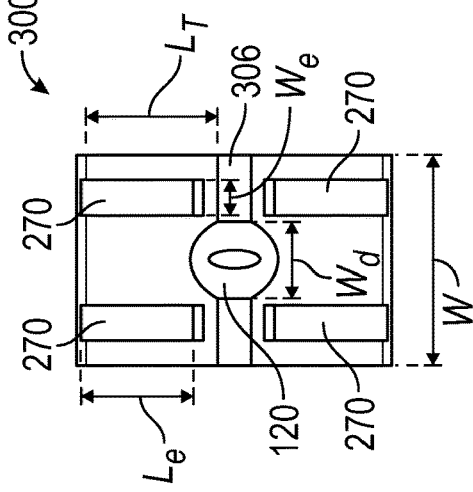
FIG. 29 is a back view of the angle bracket coupon of FIG. 27.

With reference to FIG. 29, each bar 270 has the bar length $L_e$ that ranges from about 0.1 multiplied by the length $L_T$ of the first wall 302.2 or second wall 304.2 of the second angle bracket coupon 300.2 to about 0.9 multiplied by the length $L_T$ of the first wall 302.2 or second wall 304.2 of the second angle bracket coupon 300.2. Each bar 270 has the bar width $W_e$ that ranges from about 0.1 multiplied by the difference between the width W of the second angle bracket coupon 300.2 and the dart width $W_d$ to about 0.4 multiplied by the difference between the width W of the second angle bracket coupon 300.2 and the dart width $W_d$. With reference to FIG. 28, each bar 270 has the bar thickness $T_e$ that ranges from about 0.25 times the bar width $W_e$ to about the bar width $W_e$ (FIG. 29).

In this example, the second angle bracket coupon 300.2 also includes the three-dimensional feature or the dart 120 formed between the first wall 302.2 and the second wall 304.2 at the bend 306. In one example, the dart 120 may be integrally formed with the second angle bracket coupon 300.2 via press brake operations, stamping using a uniquely designed die and punch set, bend forming, additive manufacturing, casting, etc. The bar(s) 270 may be integrally formed with the second angle bracket coupon 300.2, or may be coupled to the second angle bracket coupon 300.2 via welding, adhesives, fasteners, etc. In other embodiments, the second angle bracket coupon 300.2 may be formed as a coupon having the first wall 302.2 and the second wall 304.2 straight (or planar) to each other and without the bar(s) 270 via stamping, casting, machining, etc. and the dart 120 and the bend 306 may be formed through a suitable secondary process, such as stamping. The bar(s) 270 may be coupled to the second angle bracket coupon 300.2 via welding, adhesives, fasteners, etc. It should be noted that the placement and size of the bar(s) 270 may be predetermined so as to not interfere with the bend 306 or the dart 120.

Figure 30:
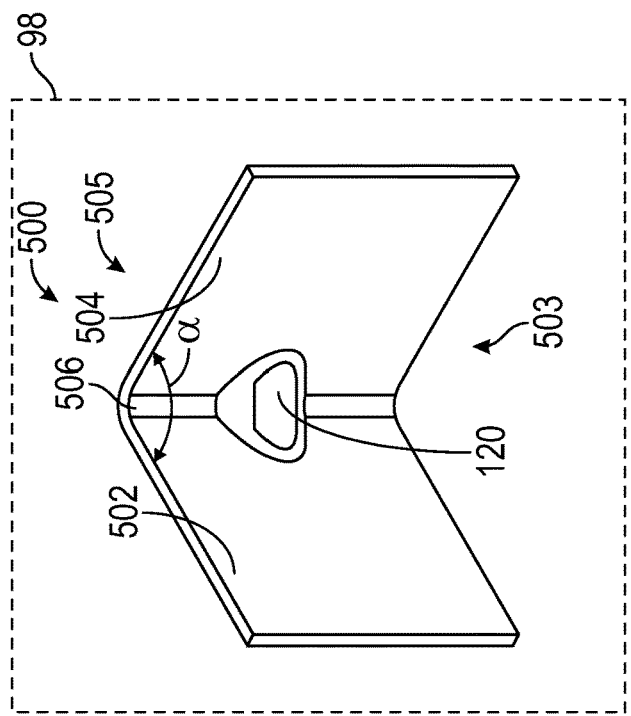
FIG. 30 is a perspective schematic illustration of another exemplary angle bracket coupon having a three-dimensional feature, such as the dart, for evaluating rigidity of the angle bracket including the dart for the vehicle in accordance with various embodiments.

With reference to FIG. 30, an exemplary third angle bracket test coupon or third angle bracket coupon 500 is shown. As will be discussed, the third angle bracket coupon 500 may be employed with one or more testing methods to evaluate the rigidity of the angle bracket associated with the vehicle 98 having the dart 120. In this regard, the third angle bracket coupon 500 is employed with different test methods to determine the rigidity of the angle bracket including the dart 120. As the dart 120 formed in the angle bracket coupon 100, the second angle bracket coupon 300 and the third angle bracket coupon 500 is the same in this example, and features of the angle bracket coupon 100 and the third angle bracket coupon 500 are substantially the same or the same, the same reference numerals will be used to denote the same or substantially the same features. The third angle bracket coupon 500 includes a first wall 502 and a second wall 504, which are interconnected at a bend 506 such that the angle α is defined between the first wall 502 and the second wall 504. The first wall 502, the second wall 504 and the angle α defined between the first wall 502 and the second wall 504 are configured to correspond to an exemplary angle bracket, such as the angle bracket for use with the vehicle 98. Generally, the third angle bracket coupon 500 simulates the angle bracket for the vehicle 98 such that the performance of the third angle bracket coupon 500 during the testing methods discussed herein is representative of the performance of the angle bracket for the vehicle 98. In this example, the third angle bracket coupon 500 is composed of a metal or metal alloy, such as stainless steel, however, the third angle bracket coupon 500 may be composed of any suitable material, including, but not limited to polymers, metals, metal alloys, etc. In this example, the first wall 502 and the second wall 504 are illustrated and described herein as comprising smooth, flat or planar walls, however, it should be noted that the first wall 502 and the second wall 504 may include three-dimensional features, such as a slot, curvature, etc. Thus, the first wall 502 and the second wall 504 are merely examples.

In this example, the third angle bracket coupon 500 also includes the three-dimensional feature or the dart 120 formed between the first wall 502 and the second wall 504 at the bend 506. Generally, the dart 120 is defined as a projection of the third angle bracket coupon 500 inward to provide a support that extends between the first wall 502 and the second wall 504. Stated another way, the third angle bracket coupon 500 has a first coupon side 503 opposite a second coupon side 505. The dart 120 is defined through the second coupon side 505 to extend outwardly from the first coupon side 503. In this example, each of the first coupon side 503 and the second coupon side 505 are substantially smooth. In one example, the dart 120 may be integrally formed with the third angle bracket coupon 500, via press brake operations, stamping using a uniquely designed die and punch set, bend forming, additive manufacturing, casting, etc. In other embodiments, the third angle bracket coupon 500 may be formed as a coupon having the first wall 502 and the second wall 504 straight (or planar) to each other and without the dart 120 via stamping, casting, machining, etc. and the dart 120 and the bend 506 may be formed through a suitable secondary process, such as stamping. In this example, a single dart 120 is shown, however, the third angle bracket coupon 500 may have any number of darts 120.

Figure 32:
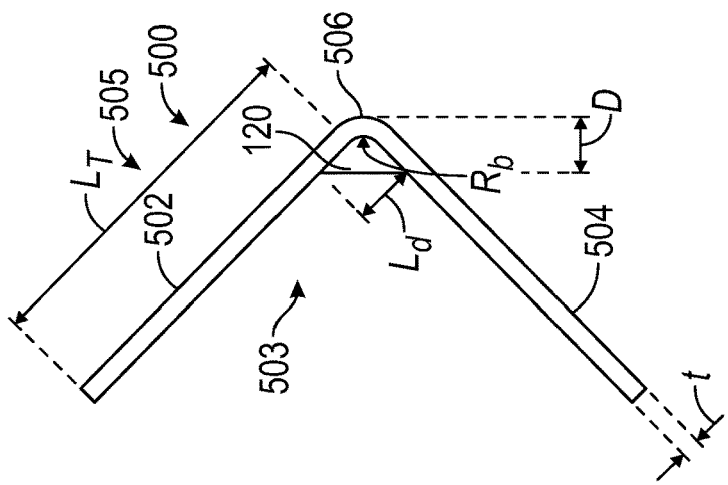
FIG. 32 is a side view of the angle bracket coupon of FIG. 31.
Figure 31:
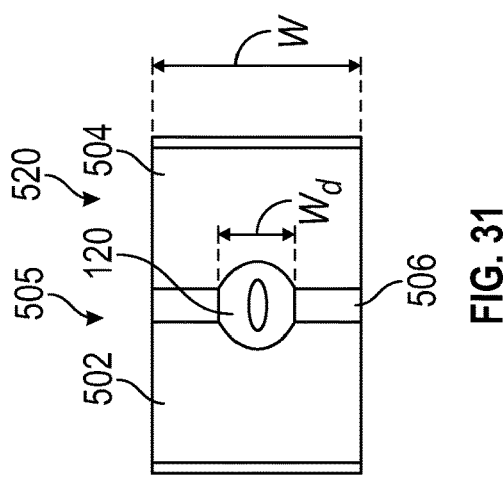
FIG. 31 is a back view of the angle bracket coupon of FIG. 31.
Figure 33:
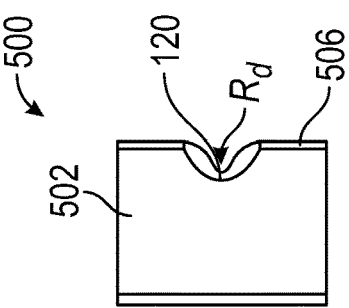
FIG. 33 is a top view of the angle bracket coupon of FIG. 31.

In one example, with reference to FIG. 31, the dart 120 has the predetermined width $W_d$. The third angle bracket coupon 500 has the width W, which is about equal to the width $W_d$ of the dart 120 (as a minimum) to about the width $W_d$ of the dart 120 multiplied by three (as a maximum). The bend 506 also has the predetermined bend radius Rb. With reference to FIG. 32, the dart 120 also has the predetermined dart length $L_d$, which is defined as the distance between an intersection between a first end of the dart 120 and the first wall 502, and an intersection between a second, opposite end of the dart 120 and the second wall 504. The dart 120 also has the predetermined depth D. For the third angle bracket coupon 500 having straight walls, such as the first wall 502 and the second wall 504, each of the first wall 502 and the second wall 504 has the length $L_T$, which is about the dart length $L_d$ (as a minimum) to about the dart length $L_d$ multiplied by six (as a maximum). The third angle bracket coupon 500 also has the thickness t. With reference to FIG. 33, the dart 120 also has the predetermined dart radius Rd, which is about 1.0 millimeters (mm) to about 5.0 millimeters (mm).

Figure 34:
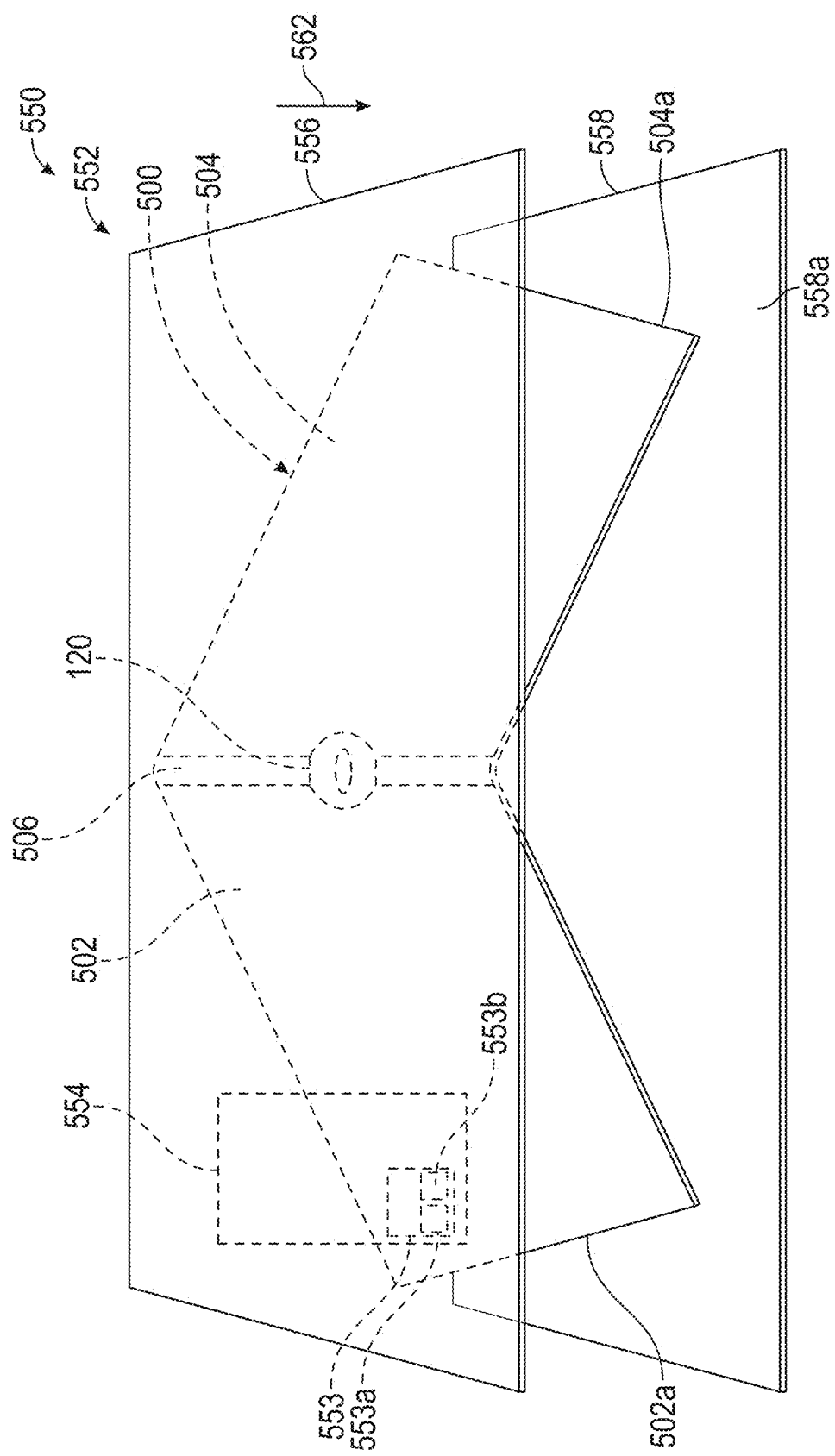
FIG. 34 is a schematic illustration of a system or fourth test setup for evaluating the rigidity of the angle bracket using the angle bracket coupon of FIG. 30.

In one example, with reference to FIG. 34, the third angle bracket coupon 500 is used in a fourth test setup 550 to evaluate the rigidity or the ability of the third angle bracket coupon 500 having the dart 120 to absorb energy under axial compression. The fourth test setup 550 is a fourth system for evaluating the rigidity of the angle bracket using the third angle bracket coupon 500. In one example, the fourth test setup 550 includes a test system 552, which includes a controller 553, a load cell 554, a first test fixture 556 and a second test fixture 558. The test system 552 comprises, but is not limited to, an MTS® Universal Testing Machine with compression plates, which is commercially available from MTS Systems Corporation of Eden Prairie, MN, USA. In this example, the first test fixture 556 and the second test fixture 558 each comprise a hard, flat plate, and the third angle bracket coupon 500 is positioned between the first test fixture 556 and the second test fixture 558 such that respective ends 502a, 504a are in contact with or lie on a surface 558a of the second test fixture 558 and the bend 506 is in contact with the first test fixture 556. The second test fixture 558 is fixed relative to the first test fixture 556. The load cell 554 is coupled to the first test fixture 556, and is controllable, via the controller 553 having a processor 553a and a memory 553b, to apply a load to the first test fixture 556 to move the first test fixture 556 relative to the second test fixture 558 while measuring an amount of force applied and the displacement. In one example, the load cell 554 has a load cell capacity of greater than or equal to about 150 kilonewtons (kN) and the first test fixture 556 has a movement speed of about 0.083 millimeters per second (mm/s) for the third angle bracket coupon 500 composed of stainless steel. It should be noted that the movement speed is merely exemplary as the movement speed may be increased for crashworthiness validation, for example.

Using the fourth test setup 550, the first test fixture 556 is moved toward the second test fixture 558 in a first direction 562 and the amount of force applied and the displacement are measured. Based on the movement of the first test fixture 556 in the first direction 562, a graph of force in kilonewtons (kN) (y-axis) versus displacement in millimeters (mm) (x-axis) is generated by the processor 553a of the controller 553 of the test system 552 for the third angle bracket coupon 500, which includes a line of the measured performance of the third angle bracket coupon 500. As discussed with regard to FIGS. 6-8, the data on the graph may be analyzed by the processor 553a of the controller 553 of the test system 552 to determine the rigidity of the third angle bracket coupon 500 under axial compression by evaluating the slope of the line. The graph may be referenced to determine how much force the third angle bracket coupon 500 absorbs and/or to evaluate the ability of the third angle bracket coupon 500 having the dart 120 to absorb energy under axial compression. The area under the graph of force versus displacement provides the energy absorption capacity of the third angle bracket coupon 500 during axial compression. The fourth test setup 550 expands the rigidity evaluation to include axial compression as angle brackets associated with the vehicle may undergo loading in different directions under different load conditions. The use of the third angle bracket coupon 500 without the support wings removes any undesired additional rigidity to the third angle bracket coupon 500 to enable accurate testing of axial compression.

Figure 35:
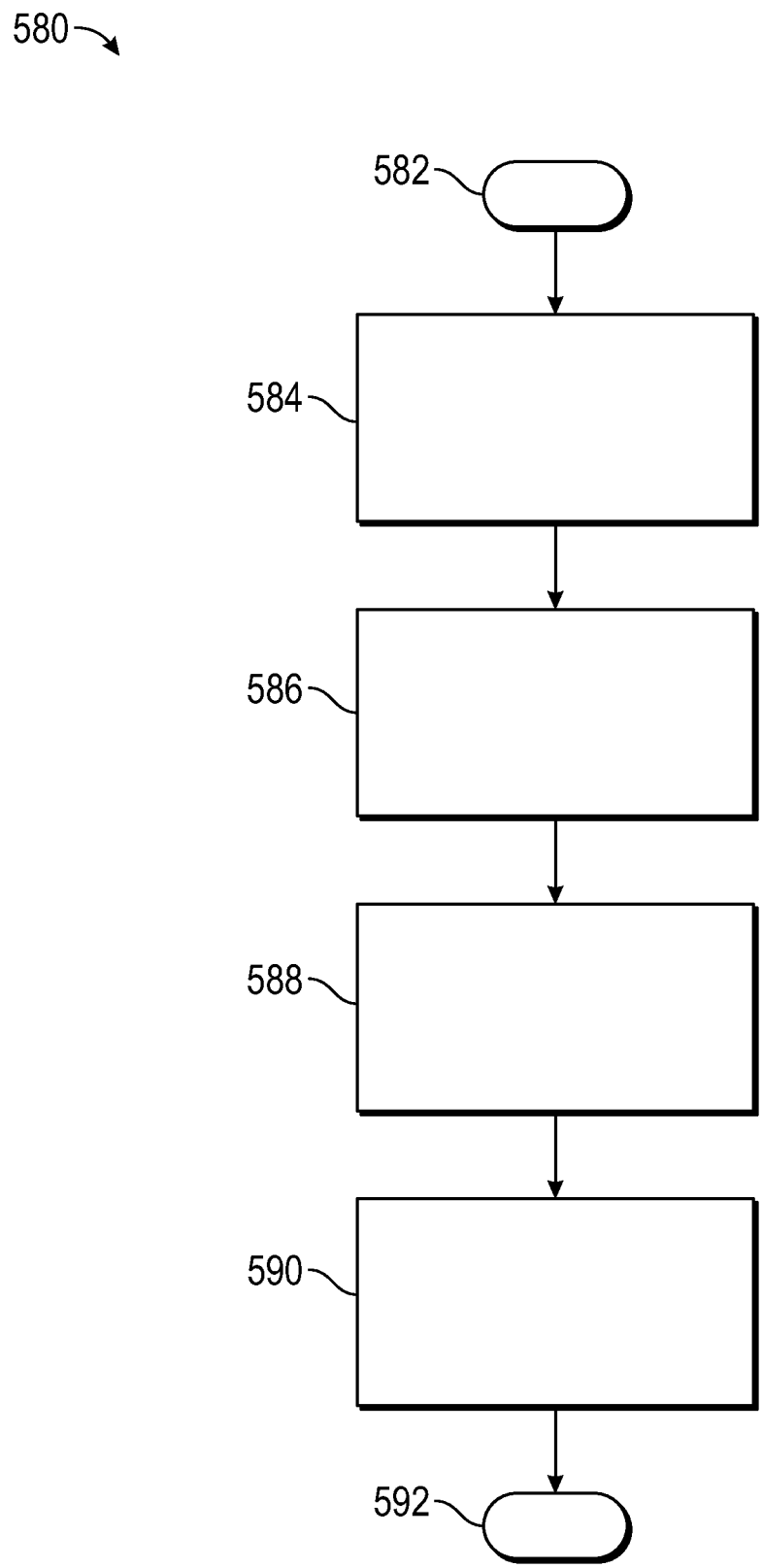
FIG. 35 is a flowchart illustrating a test method that is performed with the fourth test setup in accordance with various embodiments.

With continuing reference to FIG. 34, and additional reference to FIG. 35, a flowchart illustrates a method of evaluating the rigidity or the ability of the third angle bracket coupon 500 having the dart 120 to absorb energy under axial compression using the fourth test setup 550 or a method 580 of evaluating the rigidity or energy absorption under axial compression. The method begins at 582. At 584, the method includes coupling the third angle bracket coupon 500 to the second test fixture 558 by positioning the third angle bracket coupon 500 on the surface 558a of the second test fixture 558 so as to be between the first test fixture 556 and the second test fixture 558. At 586, the method includes moving the first test fixture 556 toward the second test fixture 558 with the test system 552 to place the third angle bracket coupon 500 under axial compression. The first test fixture 556 is moved in the first direction 562 to determine the rigidity of the third angle bracket coupon 500 during flattening. At 588, the method includes measuring, via the load cell 554, the displacement of the third angle bracket coupon 500 versus the force applied by the first test fixture 556 during the movement of the first test fixture 556 in the first direction 562. At 590, the method includes outputting the measurement data observed by the load cell 554 at 588, for example, outputting a graph of force in kilonewtons (kN) (y-axis) versus displacement in millimeters (mm) (x-axis), which includes a line representing the performance of the third angle bracket coupon 500. The method includes, performing, by the processor 553a of the controller 553 of the test system 552 the linear regression of the data in the graph of force versus displacement. The method includes, determining, by the processor 553a of the controller 553, the displacement end value for the slope calculation, based on a point at which the data from the linear regression is at the predetermined R2 value. The method includes, calculating, by the processor 553a of the controller 553 of the test system 552, the slope of the line on the graph of force versus displacement based on the initial start point of measurement and the end point determined by the linear regression to determine the rigidity of the third angle bracket coupon 500. By analyzing the graph of the force versus displacement, the rigidity and energy absorption of the third angle bracket coupon 500 having the dart 120, and thus, of the angle bracket associated with the vehicle 98 (FIG. 13) having the dart 120 under axial compression can be determined. This enables a designer to determine, based on the measurement data for the energy absorption under axial compression whether the dart 120 provides acceptable rigidity for the angle bracket of the vehicle 98 (FIG. 13) based on a predetermined threshold for energy absorption for the angle bracket associated with the vehicle 98 (FIG. 8). The method ends at 592. It should be noted that while the method 580 is described herein as using the test system 552, the method 580 may be performed using mechanical simulation software such as Abaqus FEA commercially available from Dassault Systèmes SE of Vélizy-villacoublay, France or LS-DYNA commercially available from Ansys of Canonsburg, Pennsylvania, USA to determine the ability to absorb energy under axial compression for the third angle bracket coupon 500.

Figure 36:
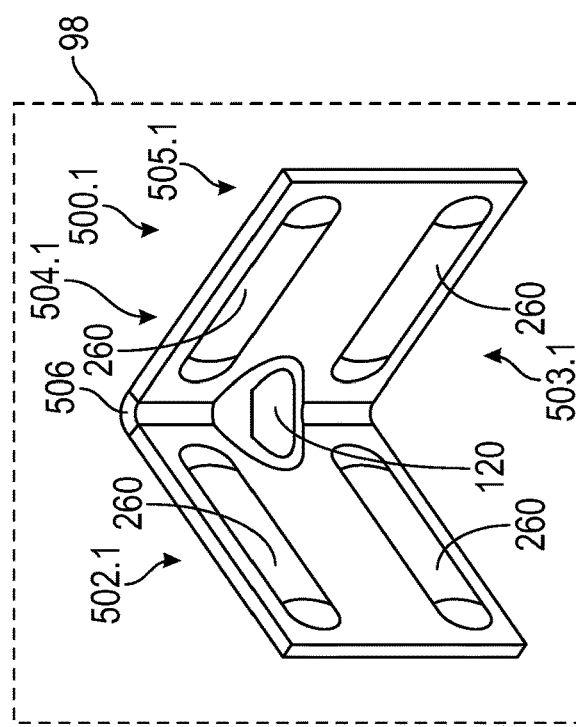
FIG. 36 is a perspective schematic illustration of an exemplary angle bracket coupon having a three-dimensional feature, such as the dart, and at least one bead for evaluating rigidity of an angle bracket for the vehicle, in accordance with various embodiments.

It should be noted that in other examples, the third angle bracket coupon 500 may be configured differently for use with the fourth test setup 550 and the test method 580. For example, with reference to FIG. 36, a third angle bracket coupon 500.1 is shown. As the third angle bracket coupon 500.1 includes the substantially similar or the same features as the third angle bracket coupon 500, the same reference numerals will be used to denote the same features. The third angle bracket coupon 500.1 may be employed with the fourth test setup 550 and the test method 580 to evaluate the rigidity of the third angle bracket coupon 500.1. The third angle bracket coupon 500.1 includes a first wall 502.1 and a second wall 504.1, which are interconnected at the bend 506 such that the angle $\alpha$ (FIG. 37) is defined between the first wall 502.1 and the second wall 504.1. The first wall 502.1, the second wall 504.1 and the angle $\alpha$ defined between the first wall 502.1 and the second wall 504.1 are configured to correspond to an exemplary angle bracket, such as the angle bracket for use with the vehicle 98. Generally, the third angle bracket coupon 500.1 simulates the angle bracket for the vehicle 98 such that the performance of the third angle bracket coupon 500.1 during the testing methods discussed herein is representative of the performance of the angle bracket for the vehicle 98. In this example, the third angle bracket coupon 500.1 is composed of a metal or metal alloy, such as stainless steel, however, the third angle bracket coupon 500.1 may be composed of any suitable material, including, but not limited to polymers, metals, metal alloys, etc.

In this example, the first wall 502.1 and the second wall 504.1 are illustrated and described herein as comprising the beads 260. The beads 260 are defined through a second side 505.1 of the third angle bracket coupon 500.1 to extend outward from a first coupon side 503.1 of the third angle bracket coupon 500.1. The first coupon side 503.1 is opposite the second coupon side 505.1. In one example, the third angle bracket coupon 500.1 includes four beads 260, however, the third angle bracket coupon 500.1 may have any number of beads 260. Further, while the third angle bracket coupon 500.1 is shown with two beads 260 on the first wall 502.1 and two beads 260 on the second wall 504.1, the first wall 502.1 or the second wall 504.1 may have a single bead 260. Further, one of the first wall 502.1 and the second wall 504.1 may include bead(s) 260 while the other first wall 502.1 and the second wall 504.1 is devoid of beads 260. In one example, each of the beads 260 is the same, however, each of the beads 260 may be different. Each bead 260 is generally in the shape of an elongated oval, but the beads 260 may have any desired shape.

Figure 37:
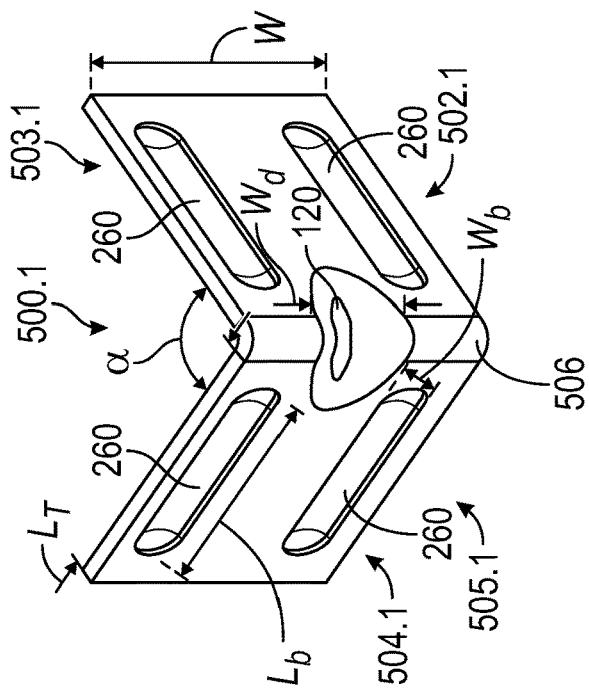
FIG. 37 is a back view of the angle bracket coupon of FIG. 36.
Figure 38:
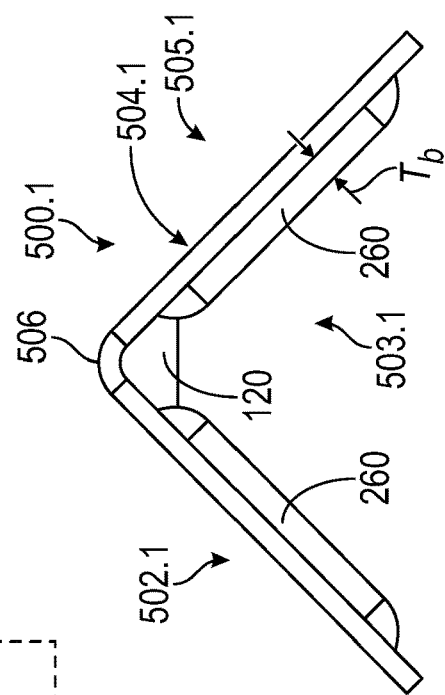
FIG. 38 is a side view of the angle bracket coupon of FIG. 36.

With reference to FIG. 37, each bead 260 has the bead length $L_b$ that ranges from about 0.1 multiplied by the length $L_T$ of the first wall 502.1 or second wall 504.1 of the third angle bracket coupon 500.1 to about 0.9 multiplied by the length $L_T$ of the first wall 502.1 or second wall 504.1 of the third angle bracket coupon 500.1. Each bead 260 has the bead width $W_b$ that ranges from about 0.1 multiplied by the difference between the width W of the third angle bracket coupon 500.1 and the dart width $W_d$ to about 0.4 multiplied by the difference between the width W of the third angle bracket coupon 500.1 and the dart width $W_d$. With reference to FIG. 38, each bead 260 has a bead depth $D_b$ that ranges from about 0.25 times the bead width $W_b$ to about the bead width $W_b$ (FIG. 37).

In this example, the third angle bracket coupon 500.1 also includes the three-dimensional feature or the dart 120 formed between the first wall 502.1 and the second wall 504.1 at the bend 506. In one example, each bead 260 may be integrally formed in the third angle bracket coupon 500.1, via stamping for example, and the dart 120 may be integrally formed with the third angle bracket coupon 500.1, via press brake operations, stamping using a uniquely designed die and punch set, bend forming, additive manufacturing, casting, etc. In other embodiments, the third angle bracket coupon 500.1 may be formed as a coupon having the first wall 502.1 and the second wall 504.1 straight (or planar) to each other and without the bead(s) 260 via stamping, casting, machining, etc. and the beads 260, the dart 120 and the bend 506 may be formed through a suitable secondary process, such as stamping. It should be noted that the placement and size of the bead(s) 260 may be predetermined so as to not interfere with the bend 506 or the dart 120.

It should be noted that in other examples, the third angle bracket coupon 500 may be configured differently for use with the fourth test setup 550 and the test method 580. For example, with reference to FIG. 39, a third angle bracket coupon 500.2 is shown. As the third angle bracket coupon 500.2 includes the substantially similar or the same features as the third angle bracket coupon 500, the same reference numerals will be used to denote the same features. The third angle bracket coupon 500.2 may be employed with the fourth test setup 550 and the test method 580 to evaluate the rigidity of an angle bracket. The third angle bracket coupon 500.2 includes a first wall 502.2 and a second wall 504.2, which are interconnected at the bend 506 such that the angle $\alpha$ is defined between the first wall 502.2 and the second wall 504.2. The first wall 502.2, the second wall 504.2 and the angle $\alpha$ defined between the first wall 502.2 and the second wall 504.2 are configured to correspond to an exemplary angle bracket, such as the angle bracket for use with the vehicle 98. Generally, the third angle bracket coupon 500.2 simulates the angle bracket for the vehicle 98 such that the performance of the third angle bracket coupon 500.2 during the testing methods discussed herein is representative of the performance of the angle bracket for the vehicle 98. In this example, the third angle bracket coupon 500.2 is composed of a metal or metal alloy, such as stainless steel, however, the third angle bracket coupon 500.2 may be composed of any suitable material, including, but not limited to polymers, metals, metal alloys, etc.

In this example, the first wall 502.2 and the second wall 504.2 are illustrated and described herein as comprising the bars 270. The bars 270 extend from a second coupon side 505.2 of the third angle bracket coupon 500.2, and the first coupon side 503 is opposite the second coupon side 505.2. In one example, the third angle bracket coupon 500.2 includes four of the bars 270, however, the third angle bracket coupon 500.2 may have any number of bars 270. Further, while the third angle bracket coupon 500.2 is shown with two bars 270 on the first wall 502.2 and two bars 270 on the second wall 504.2, the first wall 502.2 or the second wall 504.2 may have a single bar 270. Further, one of the first wall 502.2 and the second wall 504.2 may include bar(s) 270 while the other first wall 502.2 and the second wall 504.2 is devoid of bars 270. In one example, each of the bars 270 is the same, however, each of the bars 270 may be different. Each bar 270 is generally in the shape of a rectangle, but the bars 270 may have any desired shape.

Figure 39:
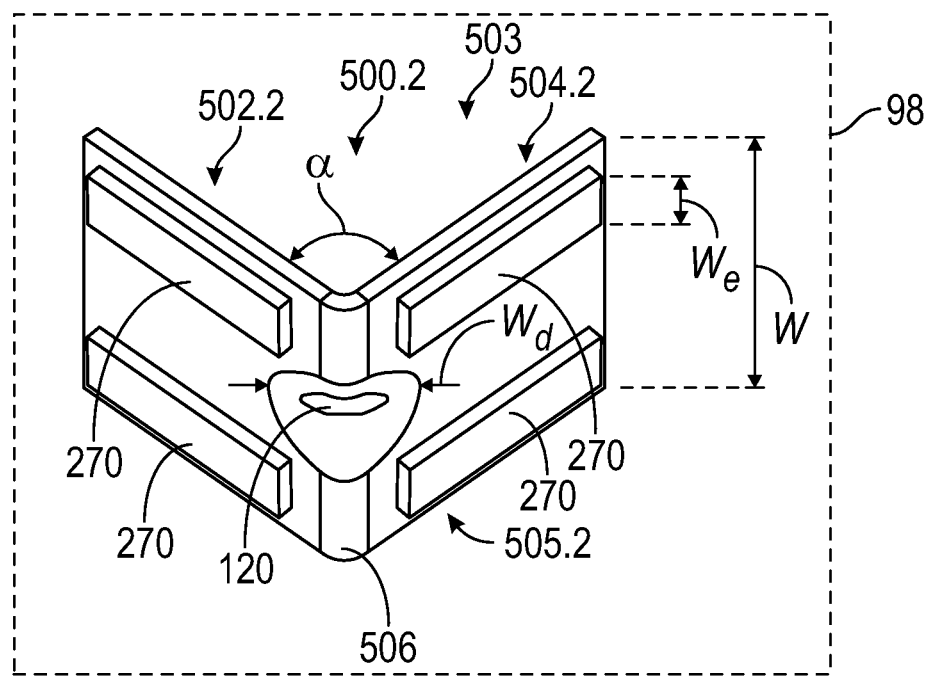
FIG. 39 is a perspective schematic illustration of another exemplary angle bracket coupon having a three-dimensional feature, such as the dart, and at least one bar for evaluating rigidity of the angle bracket for the vehicle in accordance with various embodiments.
Figure 40:
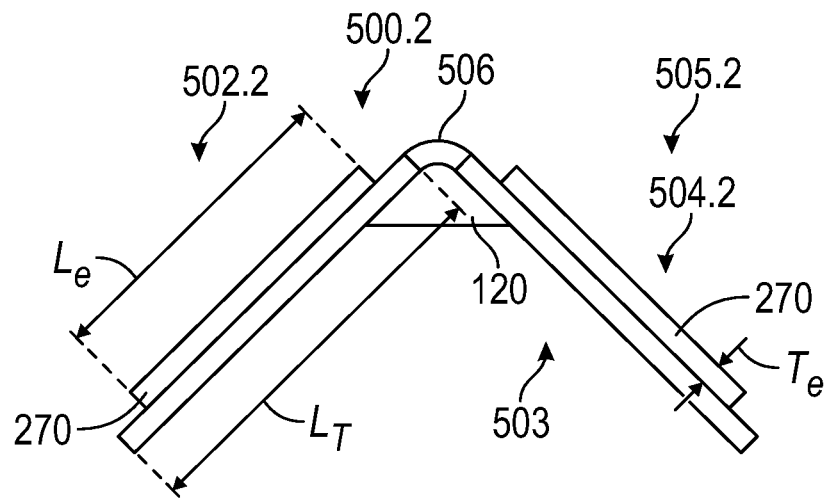
FIG. 40 is a side view of the angle bracket coupon of FIG. 39.

With reference to FIG. 40, each bar 270 has the bar length $L_e$ that ranges from about 0.1 multiplied by the length $L_T$ of the first wall 502.2 or second wall 504.2 of the third angle bracket coupon 500.2 to about 0.9 multiplied by the length $L_T$ of the first wall 502.2 or second wall 504.2 of the third angle bracket coupon 500.1. With reference back to FIG. 39, each bar 270 has the bar width $W_e$ that ranges from about 0.1 multiplied by the difference between the width W of the third angle bracket coupon 500.2 and the dart width $W_d$ to about 0.4 multiplied by the difference between the width W of the third angle bracket coupon 500.1 and the dart width $W_d$. With reference to FIG. 40, each bar 270 has the bar thickness $T_e$ that ranges from about 0.25 times the bar width $W_e$ to about the bar width $W_e$ (FIG. 39).

In this example, the third angle bracket coupon 500.2 also includes the three-dimensional feature or the dart 120 formed between the first wall 502.2 and the second wall 504.2 at the bend 506. In one example, the dart 120 may be integrally formed with the third angle bracket coupon 500.2, via press brake operations, stamping using a uniquely designed die and punch set, bend forming, additive manufacturing, casting, etc. The bar(s) 270 may be integrally formed with the third angle bracket coupon 500, or may be coupled to the third angle bracket coupon 500.2 via welding, adhesives, fasteners, etc. In other embodiments, the third angle bracket coupon 500.2 may be formed as a coupon having the first wall 502.2 and the second wall 504.2 straight (or planar) to each other and without the bar(s) 270 via stamping, casting, bend forming, machining, etc. and the dart 120 and the bend 506 may be formed through a suitable secondary process, such as stamping. The bar(s) 270 may be coupled to the third angle bracket coupon 500.2 via welding, adhesives, fasteners, etc. It should be noted that the placement and size of the bar(s) 270 may be predetermined so as to not interfere with the bend 506 or the dart 120.

Thus, the angle bracket coupon 100, 100.1, 100.2 the second angle bracket coupon 300, 300.1, 300.2 and the third angle bracket coupon 500, 500.1, 500.2 enable a designer to evaluate the rigidity of the angle bracket associated with the vehicle 98 that includes the dart 120. In this regard, by providing the angle bracket coupon 100, 100.1, 100.2 the second angle bracket coupon 300, 300.1, 300.2 and the third angle bracket coupon 500, 500.1, 500.2, the designer may determine, based on the completion of the method 180, 230, 380, 580 whether the angle bracket associated with the vehicle 98 having the same dart 120 will meet predetermined rigidity requirements. Moreover, the designer can vary the dimensions of the dart 120 and repeat the method 180, 230, 380, 580 to determine which dart 120 provides the rigidity preselected for the angle bracket. This also enables a designer to evaluate the rigidity of the angle bracket associated with the vehicle 98 with the dart 120 using the respective angle bracket coupon 100, 100.1, 100.2 the second angle bracket coupon 300, 300.1, 300.2 and the third angle bracket coupon 500, 500.1, 500.2, which reduces a cost associated with the testing of the angle bracket associated with the vehicle 98. Moreover, by providing the angle bracket coupon 100, 100.1, 100.2 the second angle bracket coupon 300, 300.1, 300.2 and the third angle bracket coupon 500, 500.1, 500.2, the first test setup 150, the second test setup 200, the third test setup 350 and the fourth test setup 550 may be used to evaluate, respectively, the rigidity or ability to resist angle change under tension (flattening, method 180, 230, 380), the rigidity or ability to resist angle change under compression (folding, method 180, 380) and the rigidity or ability to absorb energy under axial compression (method 580). The rigidity of the angle bracket is calculated based on the results of each of the test methods 180, 230, 380, 580 by determining the slope of the line on the graph of force versus displacement using the linear regression as discussed with regards to FIGS. 6-8. Further, by providing the angle bracket coupon 100, 100.1, 100.2 the second angle bracket coupon 300, 300.1, 300.2 and the third angle bracket coupon 500, 500.1, 500.2 the designer can employ various different dart 120 geometries and may determine, via the method 180, 230, 380, 580, which geometry of the dart 120 is best for a particular angle bracket. Generally, the loading applied during the test methods 180, 230, 380, 580 produce the most anticipated loading conditions for the dart 120 of the angle bracket associated with the vehicle 98 to resist in general automotive applications and each test method 180, 230, 380, 580 represents a loading mode that may be experienced by the angle bracket of the vehicle 98. It should be noted that while the angle bracket coupon 100, 100.1, 100.2 the second angle bracket coupon 300, 300.1, 300.2 and the third angle bracket coupon 500, 500.1, 500.2 have been discussed herein as being used for evaluating the ability of the angle bracket associated with the vehicle to resist angle change under tension, compression and axial compression, one or more of the angle bracket coupon 100, 100.1, 100.2 the second angle bracket coupon 300, 300.1, 300.2 and the third angle bracket coupon 500, 500.1, 500.2 may also be used to evaluate the rigidity or ability of the angle bracket associated with the vehicle to resist angle change under twisting, for example. In addition, the angle bracket coupons 100.1, 100.2, 300.1, 300.2, 500.1, 500.2 provide additional flexibility to a designer for evaluating the rigidity of the angle bracket coupon 100, 300, 500 with at least one bead 260 or at least one bar 270 and the dart 120 through the respective test method 180, 230, 380, 580.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for evaluating a rigidity of an angle bracket, comprising:
   engaging an angle bracket coupon with a first test fixture and a second test fixture, the angle bracket coupon configured to correspond to the angle bracket;
   the angle bracket coupon including a first wall, a second wall coupled to the first wall at a bend to define an angle between the first wall and the second wall, the first wall terminating at a first end or the first wall connected to a first support wing extending outwardly at an obtuse angle from the first wall, the second wall terminating at a first end or the second wall connected to a second support wing extending outwardly at an obtuse angle from the second wall, and at least one three dimensional feature defined at the bend that extends between the first wall and the second wall, and the first test fixture engaging the bend or engaging the first end of the first wall and the first end of the second wall or engaging at least one of the first support wing or the second support wing, and the second test fixture engaging the bend or engaging the first end of the first wall and the first end of the second wall or engaging at least one of the first support wing or the second support wing;

moving, by a test system, the first test fixture relative to the second test fixture;

measuring, by the test system, a force and a displacement associated with the angle bracket coupon; and outputting data of the measuring of the force and the displacement.

2. The method of claim 1, engaging the angle bracket coupon with the first test fixture and the second test fixture further comprises:

coupling the first support wing of the angle bracket coupon to the first test fixture; and coupling the second support wing of the angle bracket coupon to the second test fixture.

3. The method of claim 2, wherein each of the first test fixture and the second test fixture is a grip clamp.

4. The method of claim 3, wherein the angle bracket coupon includes one of a bead and a bar coupled to at least one of the first wall and the second wall.

5. The method of claim 2, wherein each of the first test fixture and the second test fixture is a compression plate.

6. The method of claim 2, wherein the outputting data of the measuring of the force and the displacement further comprises outputting a graph of the force versus the displacement, and determining the rigidity of the angle bracket based on a slope of the graph.

7. The method of claim 1, wherein the moving, by the test system, the first test fixture relative to the second test fixture further comprises:

moving, by the test system, the first test fixture in a first direction to apply tension to the angle bracket coupon.

8. The method of claim 7, wherein the moving, by the test system, the first test fixture relative to the second test fixture further comprises:

moving, by the test system, the first test fixture in a second direction to compress the angle bracket coupon, the second direction opposite the first direction.

9. The method of claim 7, wherein the moving, by the test system, the first test fixture relative to the second test fixture further comprises:

moving, by the test system, the first test fixture toward the second test fixture to axially compress to the angle bracket coupon to determine an amount of energy absorbed during axial compression.

* * * * *